US012808253B1

(12) United States Patent
Winters

(10) Patent No.: US 12,808,253 B1
(45) Date of Patent: Nov. 24, 2026

(54) STORAGE ASSEMBLY

(71) Applicant: Gary Winters, Cheney, WA (US)

(72) Inventor: Gary Winters, Cheney, WA (US)

( * ) Notice: Subject to any disclaimer, the term of this patent is extended or adjusted under 35 U.S.C. 154(b) by 77 days.

(21) Appl. No.: 18/632,886

(22) Filed: Apr. 11, 2024

(51) Int. Cl.
*E05G 1/024* (2006.01)

(52) U.S. Cl.
CPC .......... *E05G 1/024* (2013.01); *E05G 2700/02* (2013.01)

(58) Field of Classification Search
CPC . A47B 17/04; A47B 41/04; A47B 2021/0335; A47B 2021/0357; A47B 67/02; E05G 1/024; E05G 1/026; E05G 2700/02
USPC .......................................................... 312/312
See application file for complete search history.

(56) References Cited

U.S. PATENT DOCUMENTS

2003/0173882 A1* 9/2003 Koons .................... A47B 88/43 312/334.7
2012/0153788 A1* 6/2012 Rozestraten ....... A47B 21/0073 312/310
2014/0103785 A1* 4/2014 Richards ................ E05G 1/024 312/204
2016/0326792 A1* 11/2016 Hjort ......................... E05G 1/04

* cited by examiner

*Primary Examiner* — Matthew W Ing
(74) *Attorney, Agent, or Firm* — Lee & Hayes, P.C.

(57) ABSTRACT

An apparatus includes a first frame, a second frame, and one or more guide rails. The first frame defines an interior cavity and is configured to be at least partially disposed within a structure. The second frame slidably engages with the first frame and is configured to move between (i) a first position in which the second frame is disposed over the interior cavity to restrict access to the interior cavity and (ii) a second position in which the second frame is spaced apart from the interior cavity to permit access to the interior cavity. The one or more guide rails couple the first frame and the second frame and are configured to transition the second frame between the first position and the second position in a direction that is non-parallel to a surface of the structure.

20 Claims, 16 Drawing Sheets

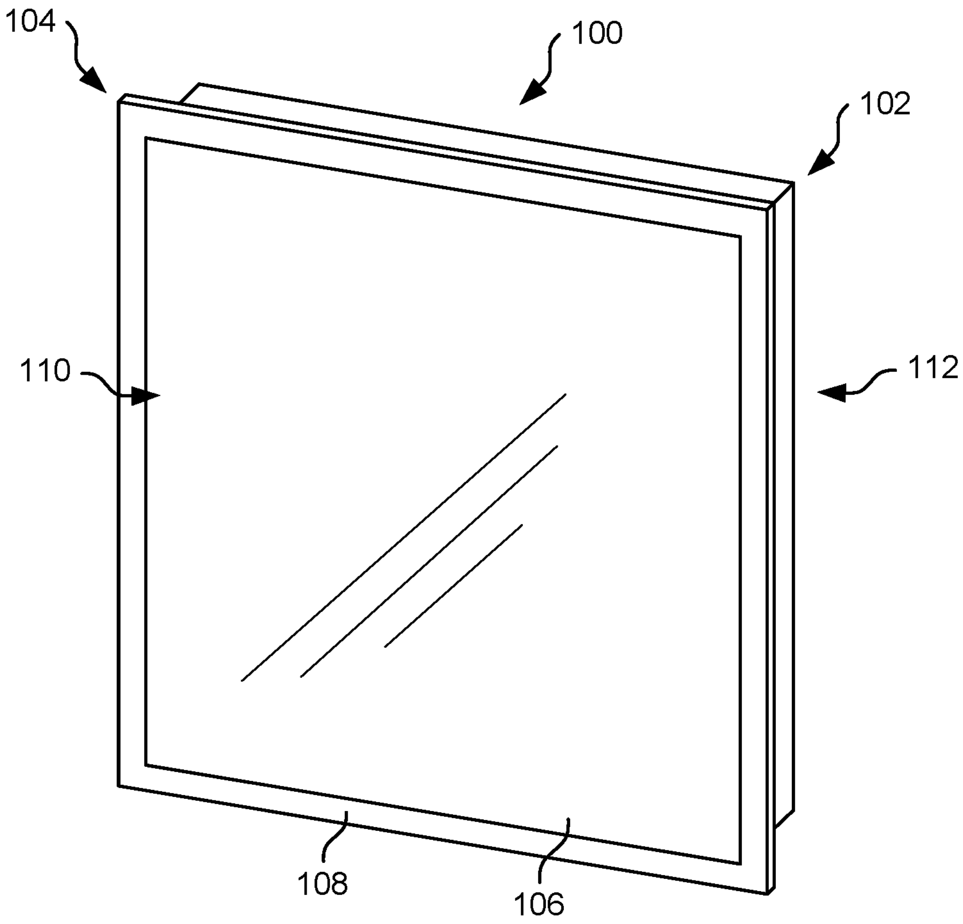
FIG. 1
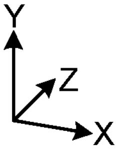

STORAGE ASSEMBLY

BACKGROUND

People often store valuables in discrete places to prevent theft, misuse, and the like. In some examples, safes or other types of lockable or disguisable/hidden cabinets may be used to secure such valuables. However, safes and similar cabinets are generally conspicuous, bulky, and non-conforming to the average building environment, and thus, it is difficult to conceal their presence within a building, home, or other dwelling space. As a result, the conspicuousness of a safe or cabinet used for a similar purpose often attracts people, thereby leading to the undesirable discovery of concealed valuables.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 1 illustrates a perspective view of an example storage assembly in a closed state, according to an embodiment of the present disclosure.

DETAILED DESCRIPTION

Figure 2:
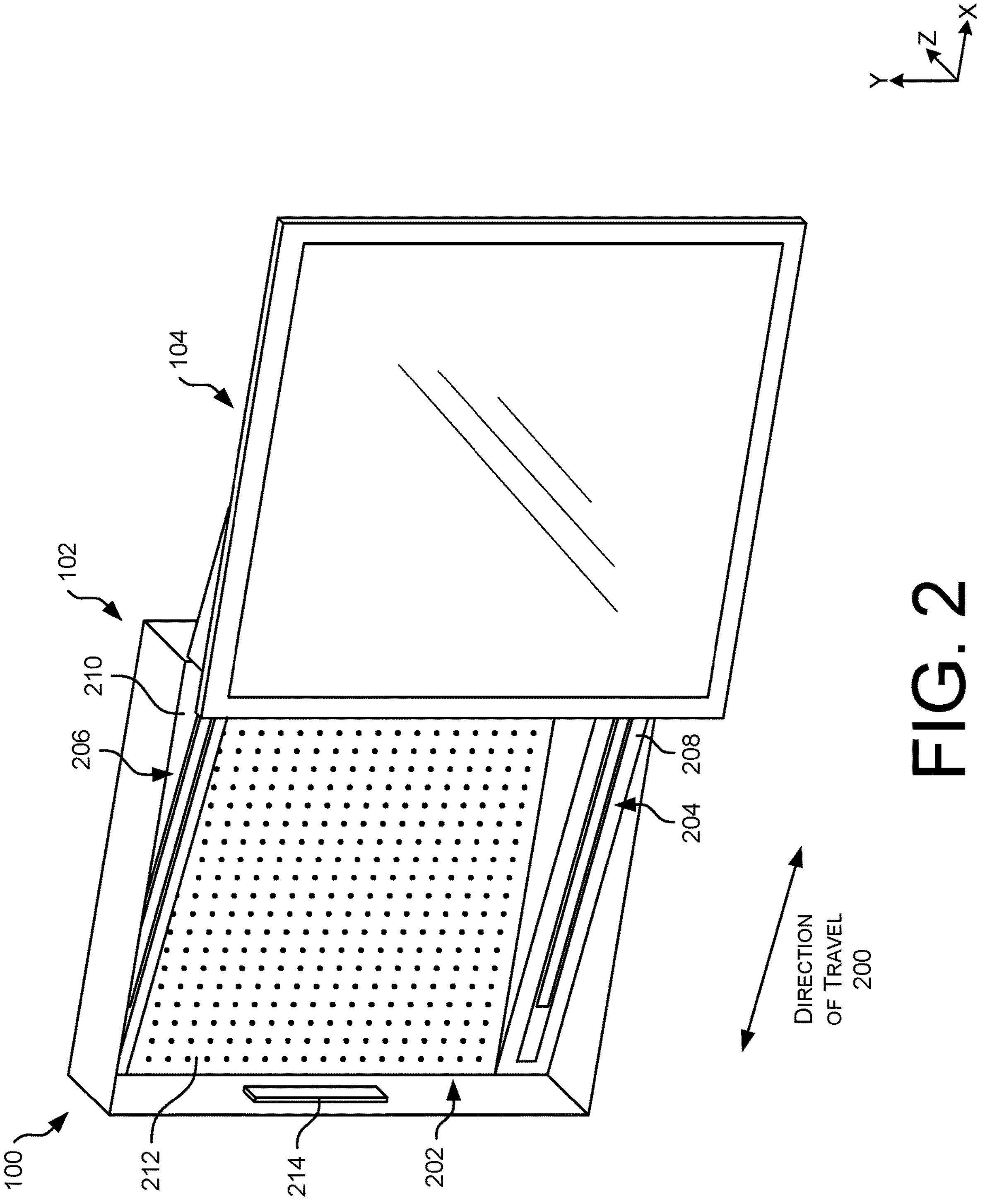
FIG. 2 illustrates a perspective view of the storage assembly of FIG. 1 in an open state, according to an embodiment of the present disclosure.

This application is directed, at least in part, to a storage assembly (e.g., device, apparatus, system, etc.) that is configured to transition between a closed state and an open state. In the closed state, access to an interior cavity of the storage assembly may be restricted. Comparatively, in the open state, access to the interior cavity of the storage container may be permitted. In an embodiment, the storage assembly may include a first frame and a second frame that operably couple to one another, for example, to permit transitioning of the storage assembly between the closed state and the open state. For example, one or more guide rails may operably couple the first frame and the second frame. In an embodiment, the first frame may be secured within a structure, such as a wall, and the second frame may operably couple to the first frame via the one or more guide rails. The second frame may be pulled, push, or otherwise moved (e.g., between the closed state and the open state) to access the interior cavity of the storage assembly. In an embodiment, the storage assembly may be discretely mounted within the wall to conceal the presence of the storage assembly.

In an embodiment, the storage assembly may be a wall-mounted storage assembly that is secured into a structure of a house, dwelling, etc. For example, the first frame of the storage assembly may be disposed within the wall. In an embodiment, the first frame may include a box structure that at least partially defines the interior cavity of the storage assembly. The first frame may be mounted, coupled, or otherwise disposed in the wall using various anchors, fasteners, etc. In an embodiment, sheetrock, studs, piping, electrical, etc. within the wall may be respectively removed, reframed, rerouted, etc. to permit installation of the storage assembly within the wall. In an embodiment, the storage assembly may be installed during or after construction of a dwelling, such as to retrofit the storage assembly within the wall. In an embodiment, the first frame may include a front that is mounted flush with an existing surface of the wall, or offset from the surface (e.g., proud) of the wall such that when sheetrock or other surfaces (e.g., paneling, brick, etc.) are installed, the front is mounted flush with the surface.

The first frame may include a first base and a second base to which the one or more guide rails are mounted. For example, in an embodiment, the storage assembly may include a first set of guide rails disposed proximate to a bottom of the storage assembly, and a second set of guide rails disposed proximate to a top of the storage assembly. In an embodiment, a first mounting bracket, or first section, of the first set of guide rails may be mounted on the first base, while a first mounting bracket, or first section, of the second set of guide rails may be mounted on the second base. In doing so, the second frame may be supported to, or by, the first frame at more than one location. The first set of guide rails and the second set of guide rails may be made of suitable materials, thicknesses, etc. to support the weight of the second frame.

The first frame may at least partially define the interior cavity (e.g., compartment, storage area, etc.), which may be disposed between the first base and the second base. Additionally, the interior cavity may be defined as a volume determined using a width dimension between a first lateral side of the first frame and a second lateral side of the first frame spaced apart from the first lateral side, a height dimension between an upper side and a lower side, and a depth dimension defined as a distance measured between the first frame and the second frame spaced apart from the front. As indicated above, the storage assembly may be mounted within the wall of a building. Notably, in many industrialized locations, buildings (and especially residential dwellings) are often formed with walls having industry standard-sized structural support beams/studs (e.g., 2×4 studs, 2×6 studs, etc.). The studs are generally sandwiched between sheetrock, thereby forming a max inner wall depth ranging from about 3 in. to 6 in. The average depth may vary depending on the dimensional consistency and accuracy of the studs and stud placement and builder quality of construction. In some instances, the depth may be greater, for example if a builder deliberately uses additional studs or larger studs for a variety of reasons. Nevertheless, it is possible that a wall may have a unique "thickness" (e.g., the thickness of sheetrock on both sides of a support beam/stud width, plus the width of the support beam/stud) or depth, such as 10 or more inches, in which case the depth dimension may range, for example, from 1-10 inches or more, etc. Though most walls are thicker than one inch deep, it is considered that an individual may try to only embed a shallower storage assembly, hence the range from 1 in. to 10 in., or more. Regardless, the wall may accommodate the depth of the interior cavity, and the storage assembly, or the first frame, may be manufactured to different specifications and sizes depending upon specifics of the wall and/or a sized of the interior cavity desired.

Additionally, the interior cavity may include shelving, hooks, pegs, concealed safes (i.e., the opening of a safe further embedded within the cavity and/or through the wall into the space behind the wall), or other mechanisms for storing items. In an embodiment, pegboard, slatwall, Gondola starter units, or other types of modular backboards may be disposed within the interior cavity, and/or may form or be used as the interior backing of the storage assembly. Here, various modular shelving, hooks, etc. may be coupled to the modular backboard to store any number of items, in a variety of orientations, within the interior cavity. In an embodiment, the items may include money, jewelry, weapons, medications, passports, and so forth. Further, in an embodiment, lighting elements (e.g., light emitting diode (LED) strips) may be disposed within the interior cavity to provide lighting to the interior cavity. In an embodiment, the lighting elements may be powered via battery, or mains power (e.g., via wires routed within the wall). Moreover, switches may be used to turn the lighting elements on/off. For example, door switches (e.g., magnetic contact switch, pressure switch, etc.) may control the lighting elements to turn off when the storage assembly is in the closed state and may control the lighting elements to turn on when the storage assembly is in the open state. Alternatively, other switches (e.g., buttons) may be used to control the lighting elements.

The second frame may include a front and a back spaced apart from the front. The front may serve as an exterior of the storage assembly and may conceal the storage assembly within the wall. In an embodiment, a mirror, painting, picture, television, shelf, and/or other décor may be disposed on the front in order to conceal the storage assembly. Moreover, trim work or other molding may be disposed on the exterior and/or sides of the second frame to further conceal the storage assembly. For example, the trim may match existing trim, molding, etc. on the wall to conceal the presence of the storage assembly.

The back of the second frame may include a first platform and a second platform on which portions of the first set of guide rails and the second set of guide rails are disposed, respectively. For example, a second mounting bracket, or second section, of the first set of guide rails may be mounted on the first platform, while a second mounting bracket, or second section, of the second set of guide rails may be mounted on a second platform. The first platform may be disposed proximate to the bottom of the second frame and the second platform may be disposed proximate to the top of the second frame. A third section of the first set of guide rails may couple the first section and the second section of the first set of guide rails. The third section of the first set of guide rails may translate within, along, over, etc. the first section and/or the second section, respectively. Likewise, a third section of the second set of guide rails may couple the first section and the second section of the second set of guide rails. The third section of the second set of guide rails may translate within, along, over, etc. the first section and/or the second section, respectively. In an embodiment, the second frame may be moved via a user pulling or pushing on the second frame. However, in an embodiment, motors, actuators, belts, chains, pulleys, gears, springs etc. may actuate to move the second frame for providing and restricting access to the interior cavity.

In an embodiment, the first set of guide rails and the second set of guide rails may be arranged in a non-parallel, non-planar, etc. orientation with respect to the surface of the wall. For example, the first base and the second base may be oriented at a non-parallel angle relative to the front of the first frame (or more generally, the wall). Similarly, in an embodiment, the first platform and the second platform may be complimentary angled. In an embodiment, the first base may be congruent with the first platform and the second base may be congruent with the second platform. The angling of the first base may accommodate the first platform in the closed state, and the angling of the second base may accommodate the second platform in the closed state. In other words, the first base and first platform may fit together in the closed state, and the second base and the second platform may fit together in the closed state.

The angling of the first set of guide rails and the second set of guide rails permits the second frame, when moved to access the interior cavity (e.g., to the open state), to extend in a direction away from the wall. In other words, the second frame may not move parallel to the wall between the closed state and the open state. The angling of the first set of guide rails and the second set of guide rails avoids edges, sides, etc. of the second frame contacting light switches, jambs, or other décor hanging on the wall, ceiling, etc. adjacent to the storage assemble. Moreover, given the angling of the first set of guide rails and the second set of guide rails, the second frame may recess into the first frame in the closed state and gaps may be avoided between the second frame and the surface of the wall. That is, by making the second frame open and close in a non-parallel nature relative to the surface of the wall, the second frame may more snugly fit against the surface of the wall without requiring a gap, space, crack, offset, etc. in order to provide clearance to open the second frame. In doing so, the storage assembly may be less conspicuous and concealed.

In an embodiment, the first base and the second base (or surfaces thereof) may be oriented between ten degrees and thirty degrees relative to the front of the first frame, the exterior surface of the wall, etc. In an embodiment, the first base and the second base may be oriented at an angle that is greater than zero degrees, but less than ninety degrees. The first platform and the second platform may be oriented at an angle that is complimentary to the first base and the second base, respectively. For example, the first platform and the second platform may be oriented at an angle relative to the front of the second frame, between ten degrees and thirty degrees. However, in an embodiment, the first platform and the second platform may be oriented at an angle greater than zero degrees but less than ninety degrees.

In an embodiment, the first set of guide rails and/or the second set of guide rails may include two-section guide rails, three-section guide rails, four-section guide rails, etc. The first set of guide rails and/or the second set of guide rails may include ball bearings, rollers, etc. The first set of guide rails and the second set of guide rails, or mounting brackets thereof, may be secured to the first frame and the second frame, respectively, using various fasteners, anchors, etc. For example, the sections of the first set of guide rails and the second set of guide rails may be disposed on the first base, the second base, the first platform, and the second platform, respectively. However, although discussed herein as using guide rails, other tracks, slides, carriage-mechanisms, etc. may be used to transition the second frame between the open state and the closed state. Moreover, the second frame may be configured to move in other directions or orientations rather than being slid. For example, the second frame may be hingedly coupled to the first frame and the second frame, may be moved via one or more linear actuators (e.g., gas cylinders), and so forth.

In an embodiment, the storage assembly may be square shaped. However, other shapes are envisioned, such as being hexagonally shaped, rectangular shaped, circular shaped, and so forth. The first frame and the second frame may or may not be the same shape. However, in an embodiment, the second frame may be dimensioned larger than the first frame in order to conceal the front of the first frame in the closed state of the storage assembly. That is, in the closed state, the first frame may not be visible.

The first frame and/or the second frame may be manufactured from various materials, such as metal, wood, plastic, composites, and/or any combination thereof. Additionally, noted above, the second frame may include a mirror, painting, or other décor, and in such instances, the décor may be mounted to the second frame or be integrally formed within the second frame.

Although the storage assembly is described as transitioning between the closed state and the open state, the storage assembly may be configured to transition between a first configuration and a second configuration, a first state and a second state, a first position and a second position, and so forth. In these embodiments, the configurations, states, positions, etc. may provide access and restrict access to the interior cavity. Additionally, despite the storage assembly being described herein as located within a wall, the storage assembly may be located elsewhere, such as within furniture, ceilings, floors, etc.

In an embodiment, a locking mechanism may be used to lock the storage assembly. In an embodiment, the locking mechanism may include a lock, a keypad, a push pin, thumb scanner, eye reader, proximity sensor, etc. In an embodiment, the locking mechanism may be conspicuously located on the surface of the wall, the first frame, or the second frame. For example, the locking mechanism may represent a proximity sensor located beneath a particular location on the mirror known to the user, and when an object (e.g., finger) is placed within a proximity of the proximity sensor, the locking mechanism may unlock. The locking mechanism, when locked or engaged, may prevent the second frame transitioning to the open state in order to restrict access to interior cavity. When unlocked or disengaged, may permit the second frame to transition to the open state.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a perspective view of a storage assembly 100, according to an embodiment of the present disclosure. As will be explained herein, the storage assembly 100 may be installed within a wall, or other structure, in order to provide a wall-mounted storage assembly. In doing so, the storage assembly 100 may be concealed within the wall to prevent discovery of the storage assembly 100. Additionally, as will be explained herein, the storage assembly 100 may transition between a closed state, as shown in FIG. 1, and an open state in order to provide access to an interior cavity of the storage assembly 100 in which one or more item(s) are stored.

In an embodiment, the storage assembly 100 may include a first frame 102 and a second frame 104. The first frame 102 may be disposed, anchored, fastened, etc. to the wall, while the second frame 104 may slidably engage with the first frame 102 for transitioning the storage assembly 100 between the closed state and the open state. As such, in the closed state, the second frame 104 may only be visible, and the second frame 104 may conceal the first frame 102. One or more guide rails (e.g., two-section rails, three-section rails, etc.) may slidably engage the second frame 104 to the first frame 102. The second frame 104 may, in an embodiment, include a mirror 106 and/or trim 108. The mirror 106 and/or the trim 108 may assist in concealing the identity of the storage assembly 100 within or beneath the wall.

Generally, and in an embodiment, the storage assembly 100 may include a front 110 and a back 112 spaced apart from the front 110 (e.g., in the Z-direction). The front 110 may be formed at least in part by the second frame 104 and is disposed external to the wall, while the back 112 may be formed at least in part by the first frame 102 and is disposed within the wall. As will be explained herein, the second frame 104 may include a larger footprint (e.g., in the X-Y plane) than the first frame 102 in order to conceal the first frame 102 in the closed state.

FIG. 2 illustrates a perspective view of the storage assembly 100, according to an embodiment of the present disclosure. Compared to the closed state of the storage assembly 100 in FIG. 1, in FIG. 2, the storage assembly 100 is shown in an open state. For example, the second frame 104 may move in a direction of travel 200 (e.g., in the X-direction) in order to transition the storage assembly 100 from the closed state to the open state. In other words, from a first position of the second frame 104 as shown in FIG. 1, the second frame 104 may be moved to a second position as shown in FIG. 2, along the direction of travel 200, for transitioning the storage assembly 100 from the closed state to the open state.

The storage assembly 100 has an interior cavity 202 that is made accessible in the open state. For example, sliding the second frame 104 in the direction of travel 200, from the closed state in FIG. 1 to the open state in FIG. 2, provides access to the interior cavity 202. As will be explained herein, the interior cavity 202 may be defined at least in part via one or more sidewalls of the first frame 102. The sidewalls may include a depth (e.g., in the Z-direction), a height (e.g., in the Y-direction), and/or a length (e.g., in the X-direction) to define the interior cavity 202.

The storage assembly 100 includes guide rails that permit the second frame 104 to transition between the closed state and the open state. For example, the storage assembly 100 may include a first set of guide rails 204 and a second set of guide rails 206. The first set of guide rails 204 and the second set of guide rails 206 may be coupled to the first frame 102 and the second frame 104 for slidably engaging the first frame 102 and the second frame 104. As such, the first set of guide rails 204 and the second set of guide rails 206 may couple the first frame 102 and the second frame 104 together. The first set of guide rails 204 and the second set of guide rails 206 may include two sections, three sections, four sections, etc.

The first set of guide rails 204 and the second set of guide rails 206 may be at least partially disposed along a first base 208 and a second base 210 of the first frame 102, respectively. The first base 208 and the second base 210, as will be explained herein, may be disposed at an angle relative to the wall, the front 110, the back 112, etc. Given that the first set of guide rails 204 and the second set of guide rails 206 are at least partially disposed along the first base 208 and the second base 210, the first set of guide rails 204 and the second set of guide rails 206 may be correspondingly disposed at the angle. The angling of the first set of guide rails 204 and the second set of guide rails 206 permits the second frame 104 to open in a direction that is non-parallel with the surface of the wall to the which the storage assembly 100 is disposed. That is, the direction of travel 200 may not be parallel to the surface of the wall. The non-parallel movement of the second frame 104 avoids having gaps disposed between the first frame 102 and the second frame 104 in the closed state, thereby preventing the storage assembly 100 being discovered. Stated alternatively, the second frame 104 may abut flush against the surface of the wall.

The interior cavity 202 may include shelving, hooks, pegs, or other mechanisms for storing items. In an embodiment, pegboard, slatwall, Gondola starter units, or other modular backboard 212 may be disposed within the interior cavity 202. In an embodiment, the modular backboard 212 may be coupled to the first frame 102. Various modular shelving, hooks, etc. may be coupled to the modular backboard 212 to store any number of items. For example, the items may include money, jewelry, weapons, medications, passports, and so forth. As shown the modular backboard 212 may be disposed between the first set of guide rails 204 and the second set of guide rails 206. The modular backboard 212 may be disposed differently than shown (e.g., on sides, etc.).

In an embodiment, the storage assembly 100 may include one or more lighting elements 214 to provide light to the interior cavity 202. In an embodiment, the lighting elements 214 may be powered via battery, or mains power (e.g., via wires routed within a wall to which the storage assembly 100 is mounted). Moreover, switches may be used to turn the lighting elements 214 on/off. For example, door switches (e.g., magnetic contact switch, pressure switch, etc.) may control the lighting elements 214 to turn off when the storage assembly 100 is in the closed state may and control the lighting elements 214 to turn on when the storage assembly 100 is in the open state.

Figure 3:
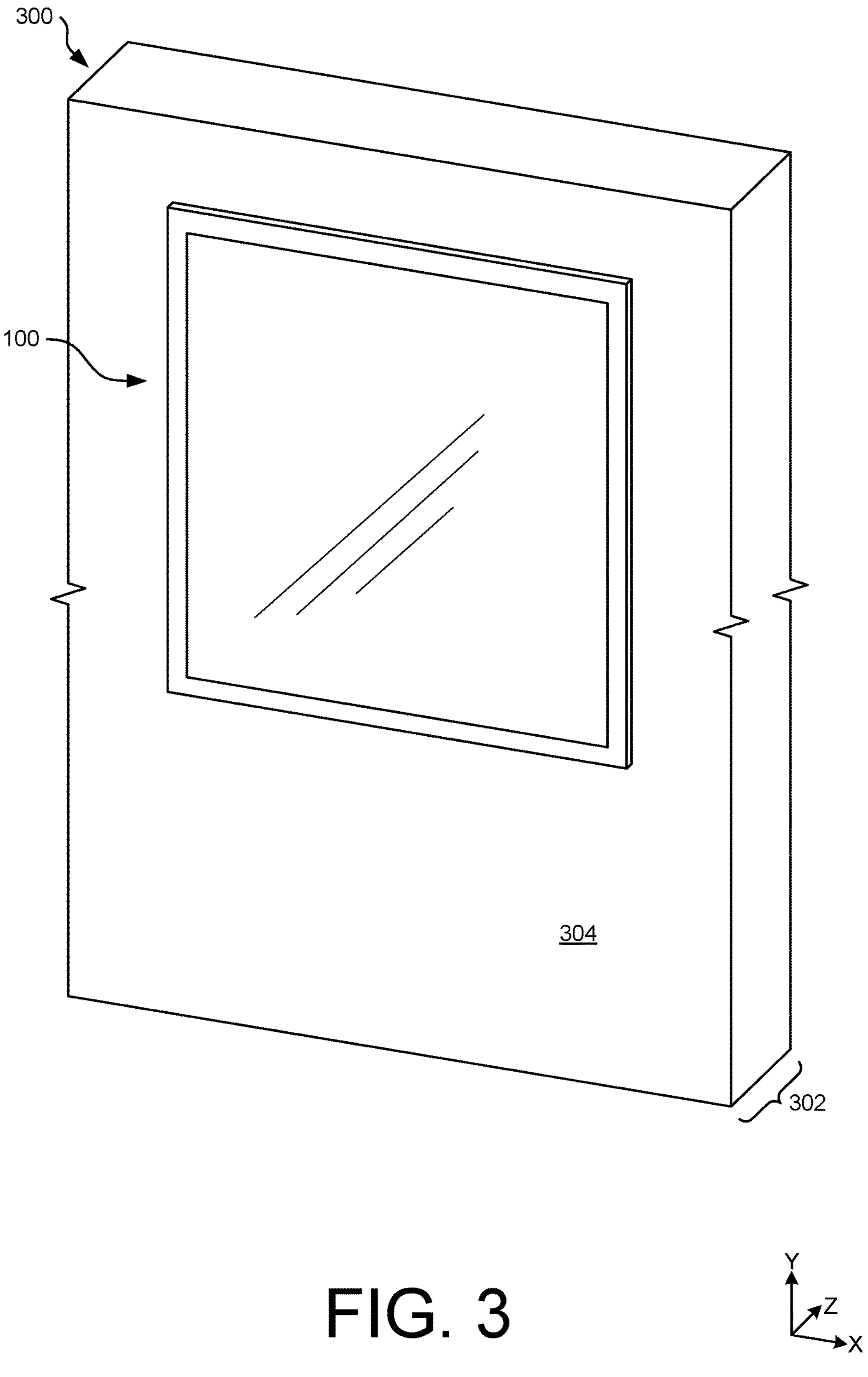
FIG. 3 illustrates a perspective view of the storage assembly of FIG. 1 in the closed state and disposed on a structure, according to an embodiment of the present disclosure.

FIG. 3 illustrates the storage assembly 100 disposed on/within a wall 300, and in the closed state, according to an embodiment of the present disclosure. The wall 300 may include a depth 302 (e.g., in the Z-direction) that accommodates a depth of the storage assembly 100, or of the first frame 102. The wall 300 may include an exterior surface 304 against which the second frame 104 abuts in the closed state. In the open state, the second frame 104 may be at least partially disposed in front of the exterior surface 304 (e.g., in the Z-direction).

The first frame 102 may be coupled to structures within the wall 300 for securing the first frame 102 within the wall 300. In an embodiment, sheetrock, studs, piping, electrical, etc. within the wall 300 may be respectively removed, reframed, rerouted, etc. to permit installation of the storage assembly 100. In an embodiment, the storage assembly 100 may be installed during or after construction of a house, such as to retrofit the storage assembly 100 within the wall 300. As will be explained herein, the first frame 102 may include a front that is mounted flush (e.g., planar) with the exterior surface 304 of the wall 300. As shown in FIG. 3, the second frame 104 may include a larger footprint to conceal the first frame 102, as well as the interior cavity 202, to prevent discovery of the storage assembly 100 in the wall 300.

Although described as being mounted to or within the wall 300, the storage assembly 100 may be mounted to other structures, such as a ceiling, floor, etc. In such instances, the storage assembly 100 may transition between the open state and the closed state differently than described.

Figure 4:
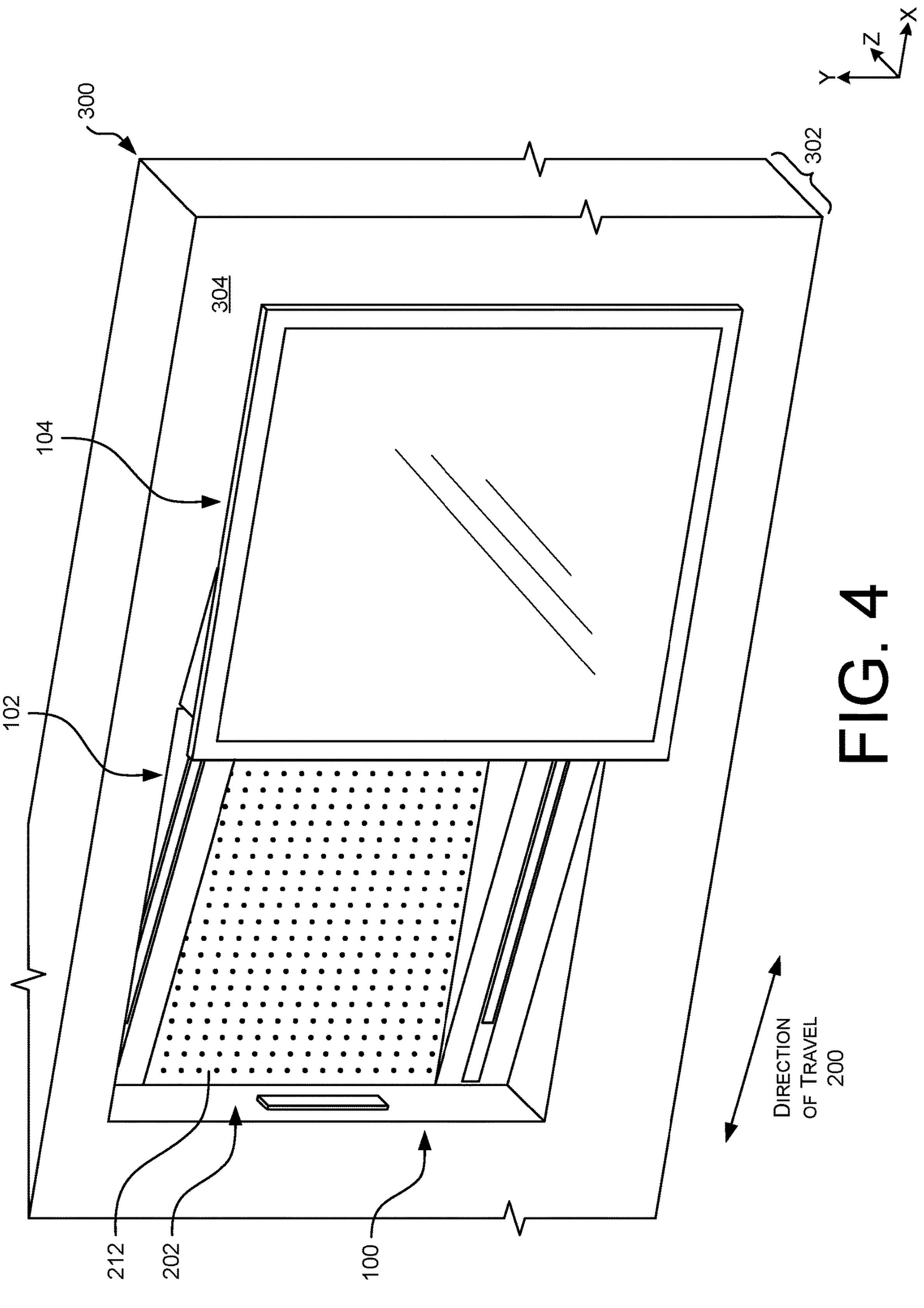
FIG. 4 illustrates a perspective view of the storage assembly of FIG. 1 in the open state and disposed on a structure, according to an embodiment of the present disclosure.

FIG. 4 illustrates the storage assembly 100 disposed on the wall 300, and in the open state, according to an embodiment of the present disclosure. For example, from the closed state of the storage assembly 100 in FIG. 3, the second frame 104 may move in the direction of travel 200 to provide access to the interior cavity 202. Within the interior cavity 202, and although not shown, item(s) may be located on shelves, hooks, etc. For example, shelving, hooks, etc. may be disposed on the modular backboard 212, and the items may rest, hang from, etc. the shelving, hooks, etc.

As noted above, movement of the second frame 104 is accomplished via the first set of guide rails 204 and the second set of guide rails 206. The first set of guide rails 204 and the second set of guide rails 206 are disposed at an angle such that the second frame opens and closes in a non-parallel (e.g., non-planar) manner with respect to the exterior surface 304 of the wall 300. In doing so, when transitioned to the open state, the second frame 104 may be spaced apart from the exterior surface 304 of the wall 300 (e.g., in the Z-direction).

Figure 5A:
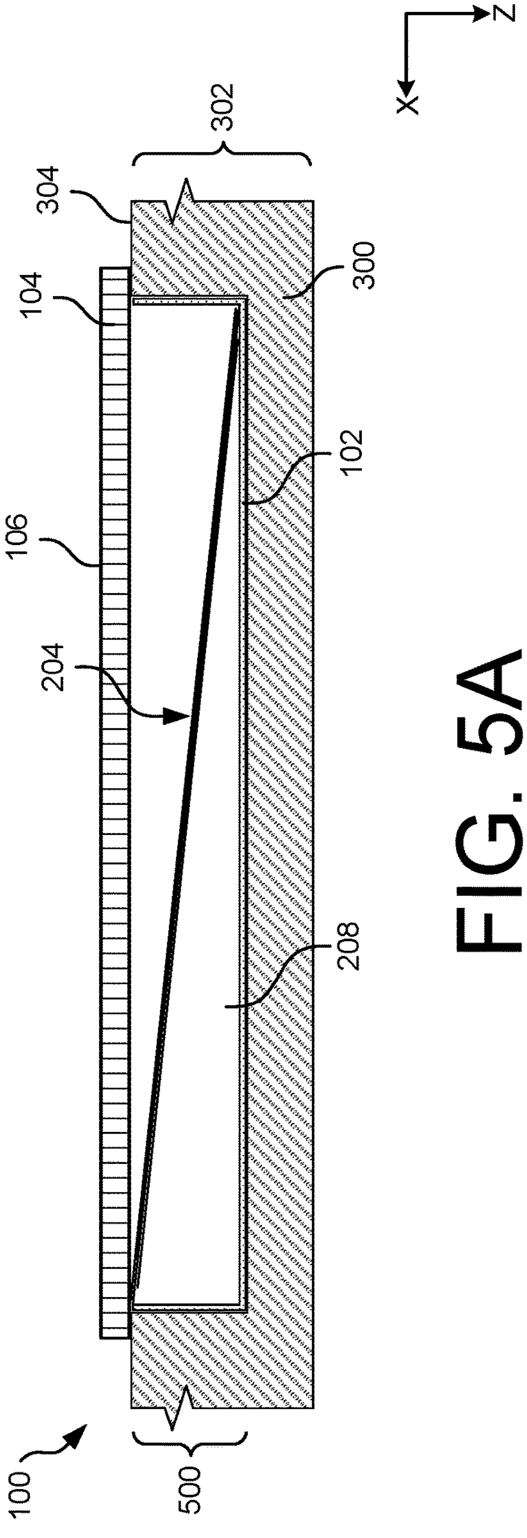
FIG. 5A illustrates a first cross-sectional view of the storage assembly of FIG. 1 in a closed state and disposed on a structure, according to an embodiment of the present disclosure.
Figure 5B:
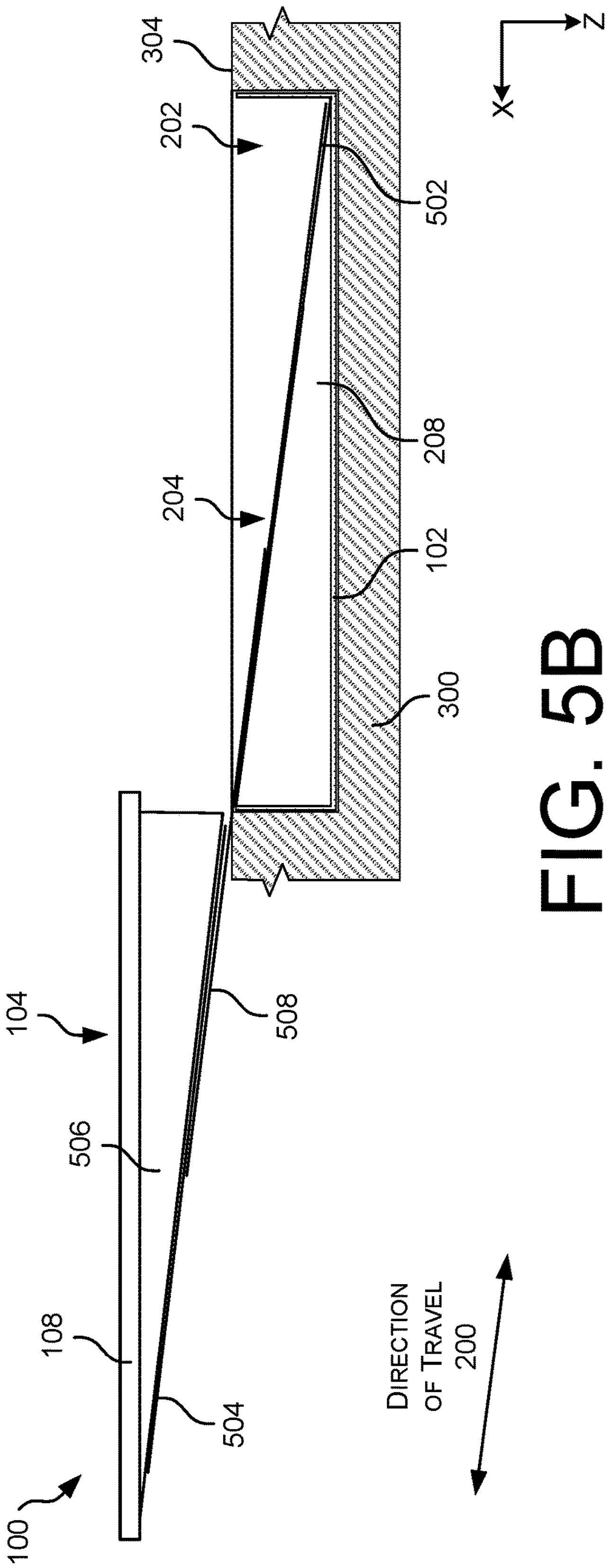
FIG. 5B illustrates a second cross-sectional view of the storage assembly of FIG. 1 in an open state and disposed on a structure, according to an embodiment of the present disclosure.

FIGS. 5A and 5B illustrate cross-sectional views of the storage assembly 100 and the wall 300, according to an embodiment of the present disclosure. In FIG. 5A, the storage assembly 100 is shown in the closed state, and in FIG. 5B, the storage assembly 100 is shown in the open state. As introduced above, the wall 300 includes the depth 302 that accommodates a depth 500 of the first frame 102. In doing so, the first frame 102 may be disposed in the wall 300. The first frame 102 may be coupled to studs or other material within the wall 300 (e.g., concrete, brick, etc.). For example, the first frame 102 may be bolted or screwed into studs within the wall 300. In the closed state of the storage assembly 100, the trim 108 of the second frame 104 may be disposed in front of the exterior surface 304 of the wall 300 to conceal the interior cavity 202 and the first frame 102.

The second frame 104 opens in the direction of travel 200, which is non-parallel to the exterior surface 304 of the wall 300. Opening of the second frame 104 in the direction of travel 200 is accomplished via the first set of guide rails 204 and the second set of guide rails 206 being disposed on bases and platforms of the first frame 102 and the second frame 104, respectively. For example, in FIG. 5B, the first set of guide rails 204 is shown. A first section 502 of the first set of guide rails 204 (e.g., a mounting bracket) may be disposed on the first base 208 of the first frame 102. A second section 504 of the first set of guide rails 204 (e.g., a mounting bracket) may be disposed on a first platform 506 of the second frame 104. A third section 508 of the first set of guide rails 204 may be disposed between the first section 502 and the second section 504. In an embodiment, the first base 208 and the first platform 506 are angled, for example, relative to the exterior surface 304 of the wall 300, the front 110 of the storage assembly 100, etc. (e.g., in the X-Z plane). For example, the first base 208 and the first platform 506 may include a triangular shape. Details of the orientation of the first base 208 and the first platform 506 are discussed herein, however, the angled nature of the first set of guide rails 204 permits the second frame 104 to open in the non-parallel nature, and in doing so, disposes the second frame 104 away from the exterior surface 304 of the wall 300. The first frame 102 and the second frame 104 include a second base and a second platform for accommodating the second set of guide rails 206.

Figure 6A:
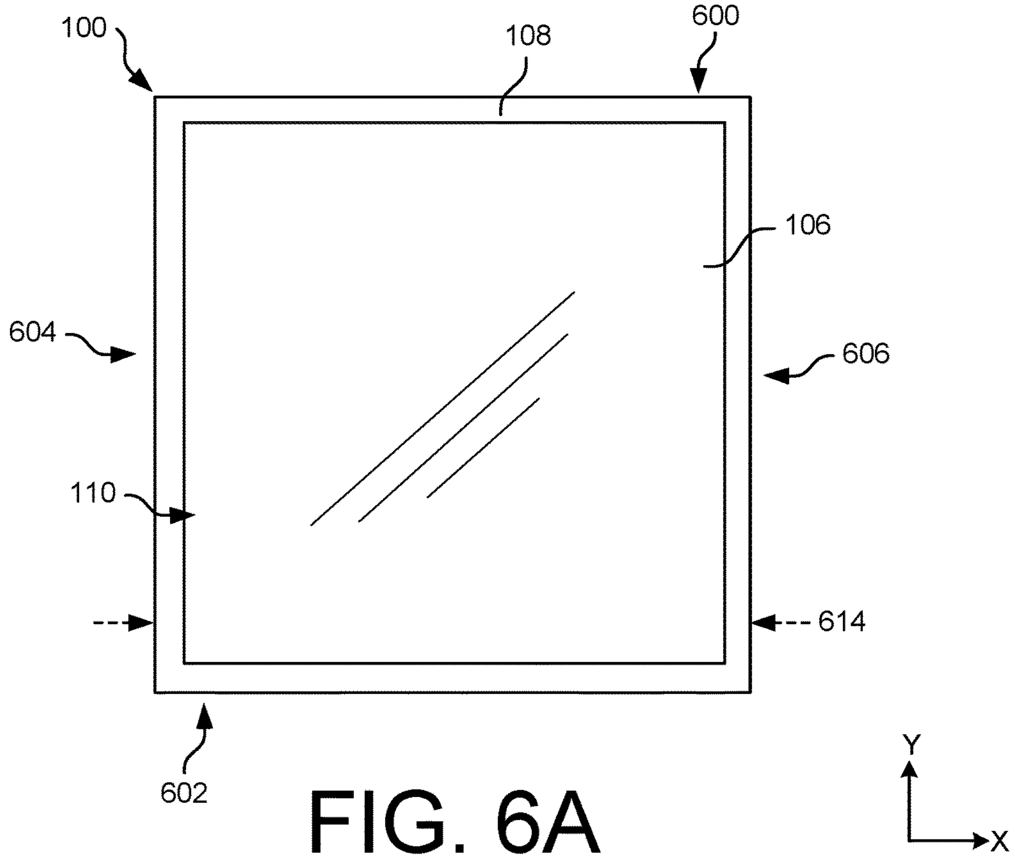
FIG. 6A illustrates a front view of the storage assembly of FIG. 1 in a closed state, according to an embodiment of the present disclosure.
Figure 6B:
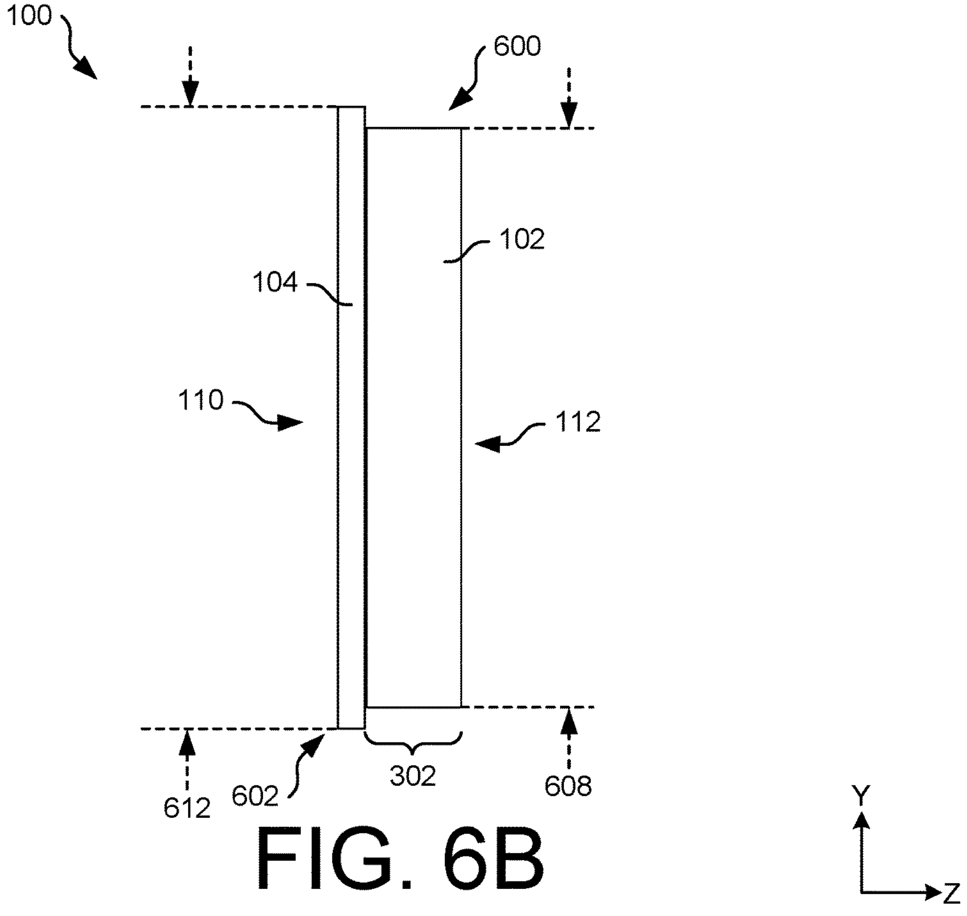
FIG. 6B illustrates a side view of the storage assembly of FIG. 1 in a closed state, according to an embodiment of the present disclosure.
Figure 6C:
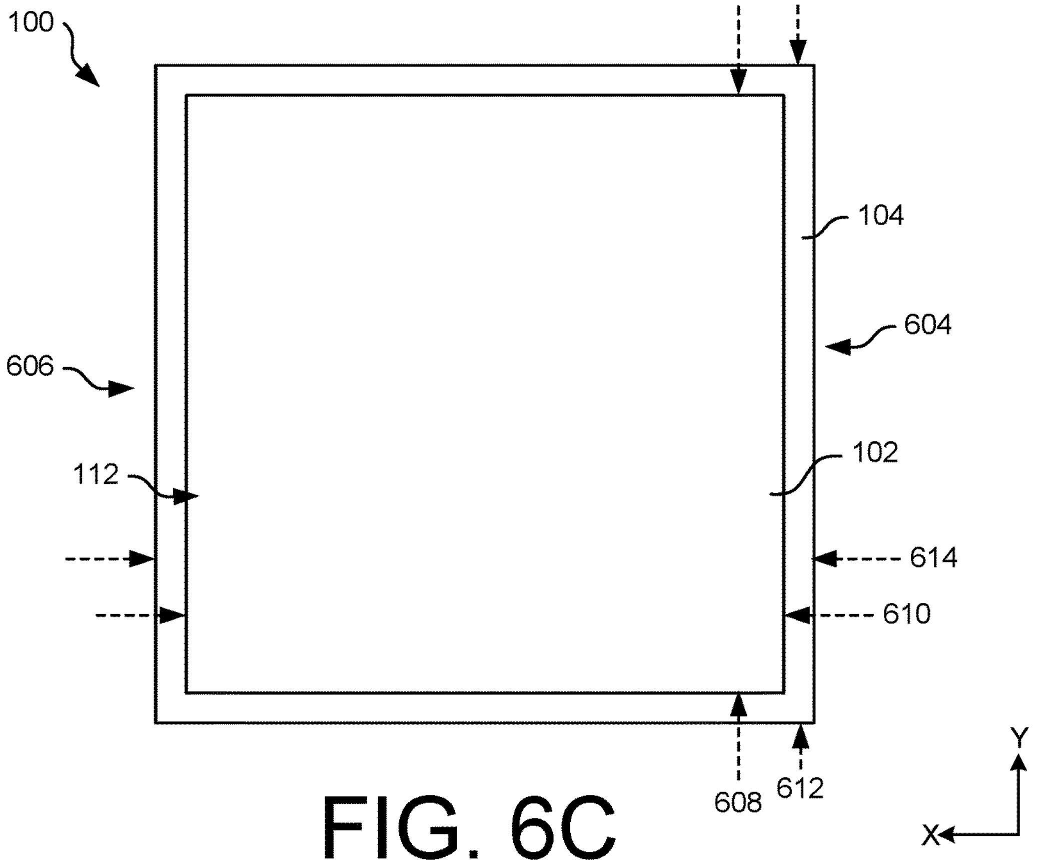
FIG. 6C illustrates a rear view of the storage assembly of FIG. 1 in a closed state, according to an embodiment of the present disclosure.

FIGS. 6A-6C illustrate various views of the storage assembly 100, according to an embodiment of the present disclosure. The storage assembly 100 may include a substantially square shape, however, other shapes are envisioned.

The storage assembly 100 may include a top 600, a bottom 602 spaced apart from the top 600 (e.g., in the Y-direction), a first side 604, a second side 606 spaced apart from the first side 604 (e.g., in the X-direction), the front 110, and the back 112 spaced apart from the front 110. As discussed above, the first frame 102 may include the depth 302 (e.g., in the Z-direction). In addition to the depth 302, the first frame 102 may include a first height 608 (e.g., in the Y-direction) and a first width 610 (e.g., in the X-direction). The second frame 104 may include a second height 612 (e.g., in the Y-direction) and a second width 614 (e.g., in the X-direction). The second height 612 may be greater than the first height 608, and/or the second width 614 may be greater than the first width 610. The second height 612 and the second width 614 may conceal the second frame 104, and the interior cavity 202, in the closed state.

The mirror 106 and the trim 108 is disposed on the front 110. Although a particular size or shape of the mirror 106 is shown, other sizes and/or shapes are envisioned. Moreover, the trim 108 may be disposed differently than shown. In an embodiment, instead of including the mirror 106, the storage assembly 100 may include a painting, picture, or other décor. Increasing a size of the mirror 106 and/or the trim 108 may change the second height 612 and/or the second width 614.

Figure 7:
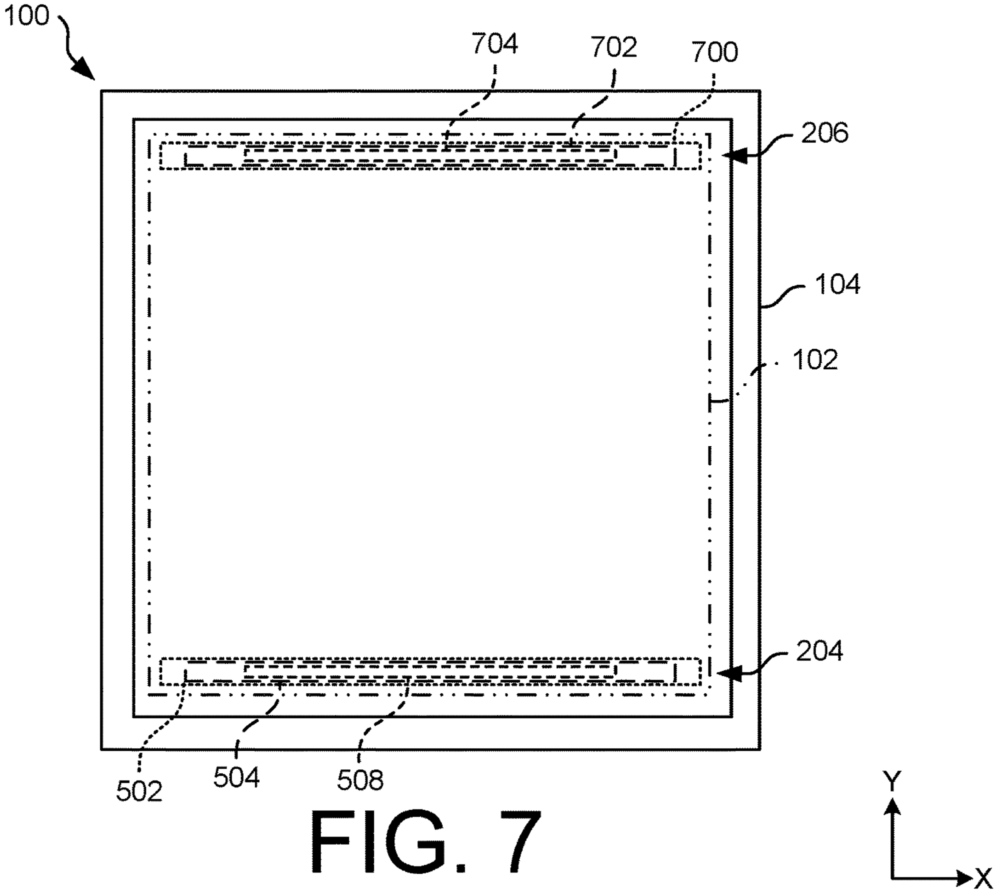
FIG. 7 illustrates a front view of the storage assembly of FIG. 1 in a closed state, showing example guide rails for transitioning the storage assembly between the closed state and an open state, according to an embodiment of the present disclosure.

FIG. 7 illustrates a front view of the storage assembly 100 in the closed state, according to an embodiment of the present disclosure. In FIG. 7, the first frame 102, the first set of guide rails 204, and the second set of guide rails 206 are shown in dashed lines.

As introduced above, the first set of guide rails 204 may include the first section 502 coupled to or disposed on the first base 208, the second section 504 coupled to or disposed on the first platform 506, and the third section 508 that adjoins the first section 502 and the second section 504. The third section 508 may translate within, on, along, etc. the first section 502 and the second section 504, respectively. The third section 508, in an embodiment, may include rollers, bearings, etc. that are received within channels, grooves, slots, etc. of the first section 502 and/or the second section 504.

The second set of guide rails 206 may include a first section 700 coupled to or disposed on the second base 210, a second section 702 coupled to or disposed on a second platform of the second frame 104, and a third section 704 that adjoins the first section 700 and the second section 702.

The first set of guide rails 204 and the second set of guide rails 206 collapse or retract into one another, respectively. Similar to the third section 508, the third section 704 may translate within, on, along, etc. the first section 700 and the second section 702. The third section 704, in an embodiment, may include rollers, bearings, etc. that are received within channels, grooves, slots, etc. of the first section 700 and/or the second section 702.

The first set of guide rails 204 and the second set of guide rails 206 collapse or retract into one another, respectively, to form a compact enclosure for the storage assembly 100. Although the first set of guide rails 204 and the second set of guide rails 206 are described as including three sections, the first set of guide rails 204 and/or the second set of guide rails 206 may include more than or less than three sections. Moreover, translational mechanisms other than guide rails may be used to transition the storage assembly 100 between the closed state and the open state. Moreover, although a certain size (e.g., in the Y-direction) and/or length (e.g., in the X-direction) of the first set of guide rails 204 and/or the second set of guide rails 206, or the sections thereof, are shown, other sizes are envisioned.

Figure 8A:
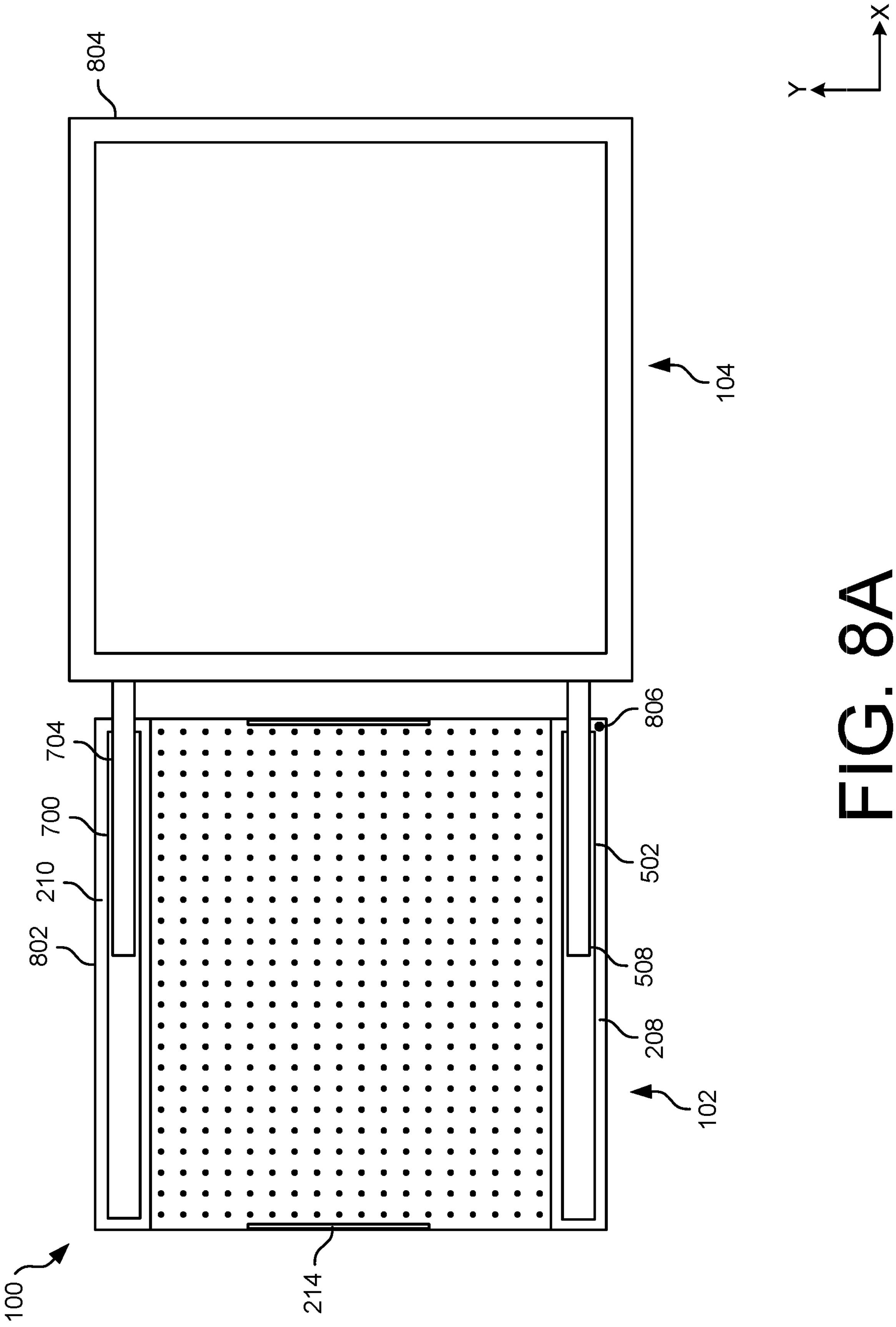
FIG. 8A illustrates a front view of the storage assembly of FIG. 1 in an open state, according to an embodiment of the present disclosure.
Figure 8B:
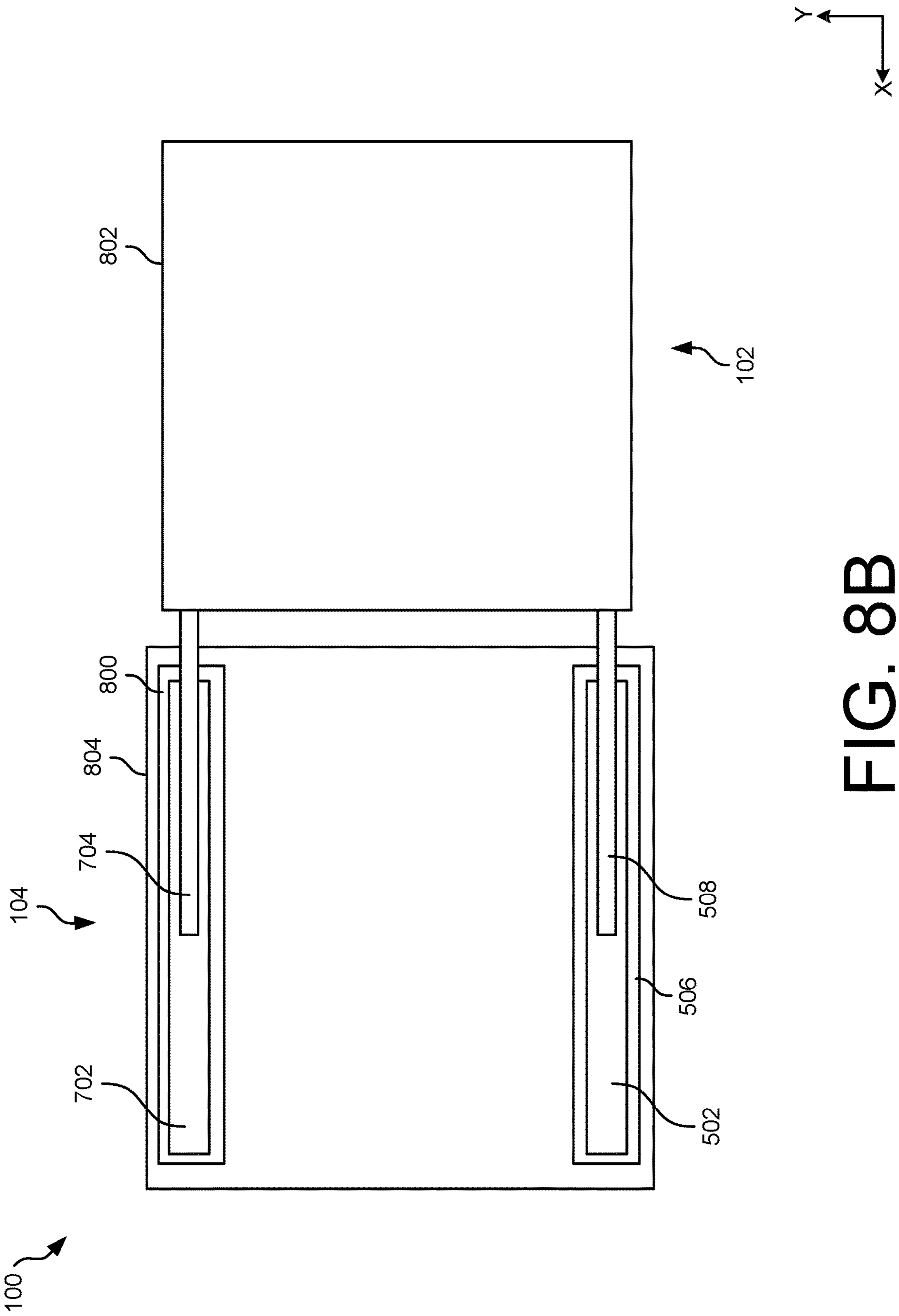
FIG. 8B illustrates a rear view of the storage assembly of FIG. 1 in an open state, according to an embodiment of the present disclosure.

FIGS. 8A and 8B illustrate the storage assembly 100 in the open state, according to an embodiment of the present disclosure. FIG. 8A illustrates a front view of the storage assembly 100, while FIG. 8B illustrates a rear view of the storage assembly 100.

The first frame 102 includes the first base 208 and a second base 210. The first section 502 of the first set of guide rails 204 is disposed on the first base 208, while the first section 700 of the second set of guide rails 206 is disposed on the second base 210. The third section 508 of the first set of guide rails 204 slidably engages with the first section 502 and the second section 504, which is disposed on the first platform 506. Similarly, the third section 704 of the second set of guide rails 206 slidably engages with the first section 700 and the second section 702, which is disposed on a second platform 800.

In the open position, the second frame 104 may extend beyond a first perimeter 802 of the first frame 102. In doing so, an entirety of the interior cavity 202 may be accessible. Stated alternatively, the second frame 104 may include a second perimeter 804, and in the open position, the second perimeter 804 may be disposed outside of the first perimeter 802. However, in an embodiment, the second frame 104 may not be opened all the way (e.g., as shown in FIGS. 8A and 8B), but may be opened to a position where the second perimeter 804 is disposed at least partially disposed within the first perimeter 802.

In an embodiment, the storage assembly 100 may include a contact switch 806 disposed on the first frame 102 (e.g., the first base 208). The contact switch 806 may be used to turn the lighting elements 214 on/off. For example, the contact switch 806 may include door switches (e.g., magnetic contact switch, pressure switch, etc.) that may control the lighting elements 214 to turn off when the storage assembly 100 is in the closed state and control the lighting elements 214 to turn on when the storage assembly 100 is in the open state. For example, a rear surface of the second frame 104, the first platform 506, etc. may contact the contact switch 806 (e.g., depress a pin) for turning on/off the lighting elements 214. However, the contact switch 806 may be located differently than shown. Moreover, in an embodiment, the storage assembly 100 may not include the contact switch 806 but may include a proximity sensor or other types of sensors to sense the position of the second frame 104 for actuating the lighting elements 214.

Figure 9A:
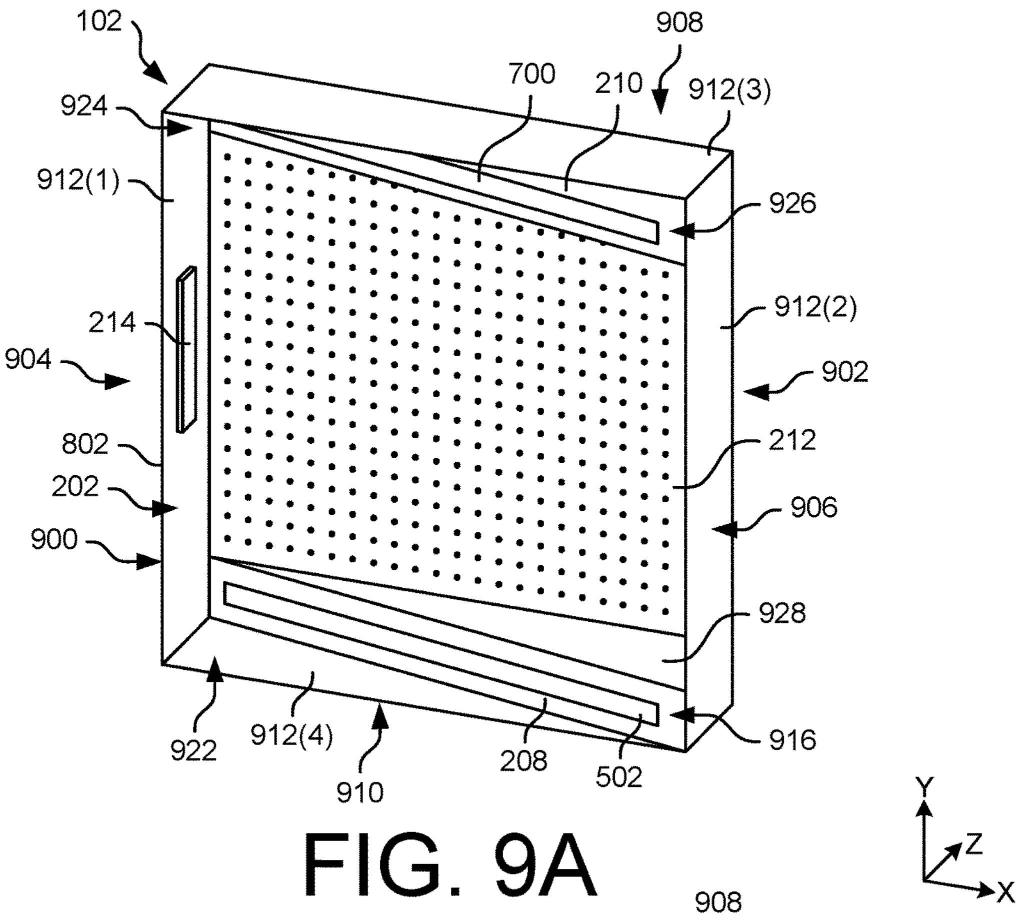
FIG. 9A illustrates a perspective view of an example first frame of the storage assembly of FIG. 1, according to an embodiment of the present disclosure.
Figure 9B:
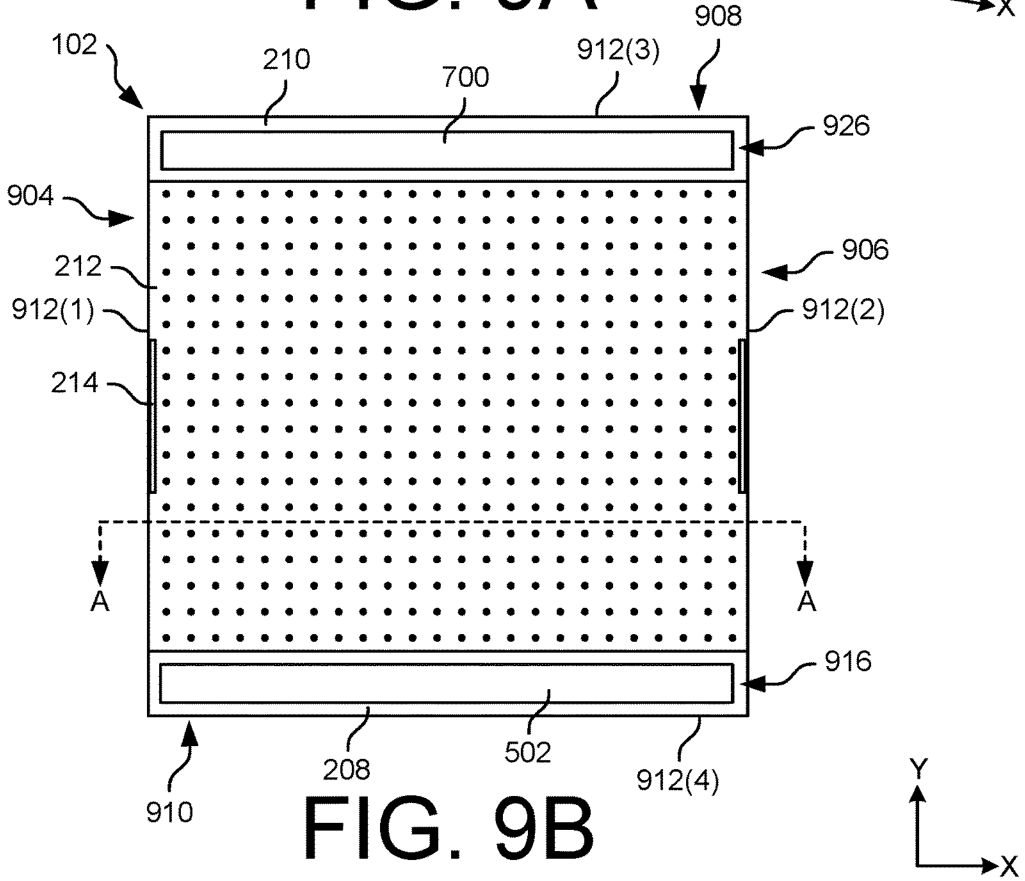
FIG. 9B illustrates a front view of the first frame of FIG. 9A, according to an embodiment of the present disclosure.
Figure 9C:
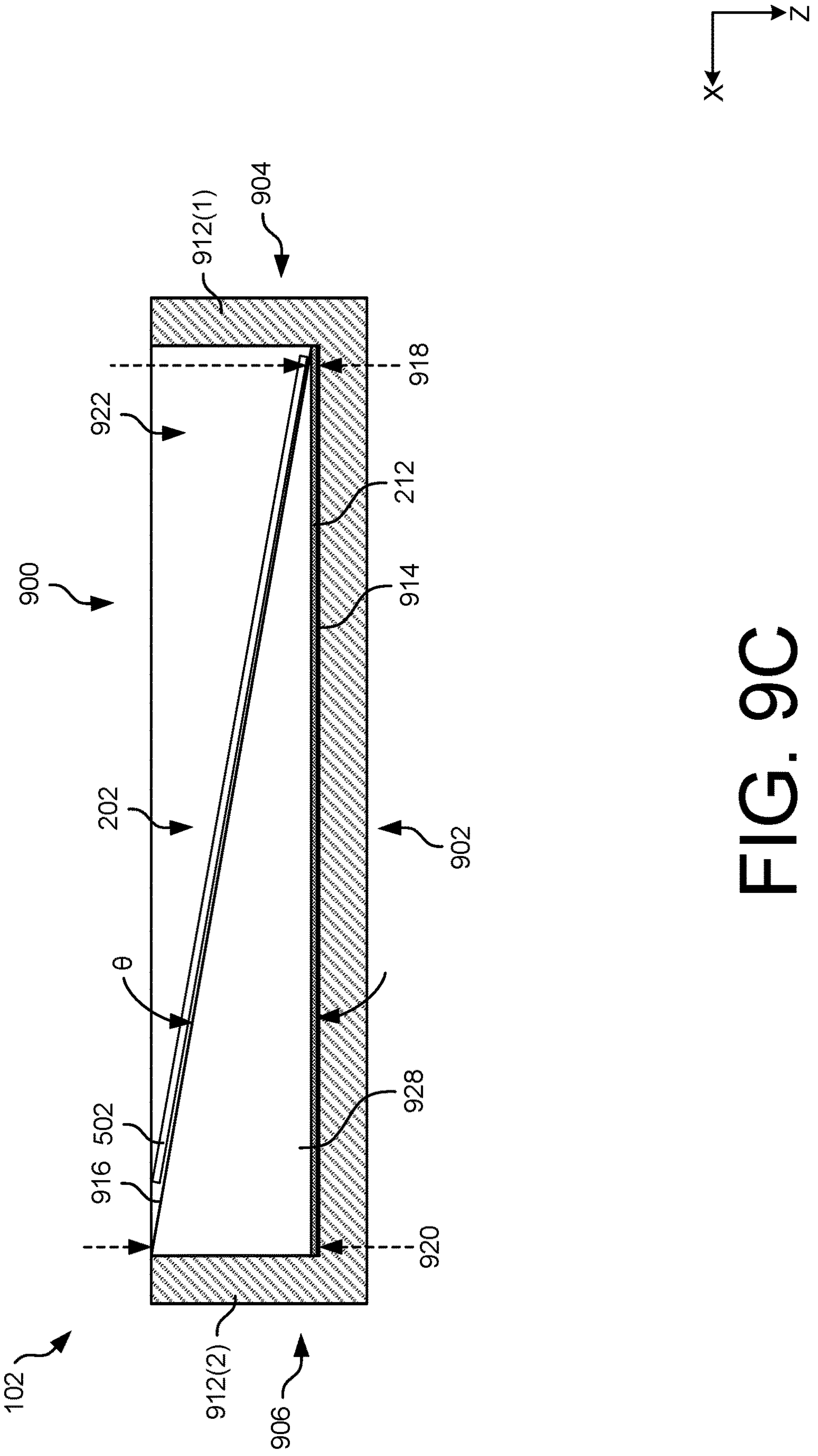
FIG. 9C illustrates a cross-sectional view of the first frame of FIG. 9A, according to an embodiment of the present disclosure.

FIGS. 9A-9C illustrates various views of the first frame 102 of the storage assembly 100, according to an embodiment of the present disclosure. FIG. 9A illustrates a front perspective view of the first frame 102, FIG. 9B illustrates a front planar view of the first frame 102, and FIG. 9C illustrates a cross-sectional view of the first frame 102, taken along line A-A of FIG. 9B.

The first frame 102 includes a front 900, a back 902 spaced apart from the front 900 (e.g., in the Z-direction), a first side 904, a second side 906 spaced apart from the first side 904 (e.g., in the X-direction), a top 908, and a bottom 910 spaced apart from the top 908 (e.g., in the Y-direction). The first width 610 may be disposed between the first side 904 and the second side 906, and the first height 608 may be disposed between the top 908 and the bottom 910.

The first frame 102 may include one or more sidewalls 912 that at least partially form the interior cavity 202. For example, the first frame 102 may include a first sidewall 912(1) disposed along the first side 904, a second sidewall 912(2) disposed along the second side 906, a third sidewall 912(3) disposed along the top 908, and a fourth sidewall 912(4) disposed along the bottom 910. A thickness of the sidewalls 912 may correspond to the depth 500 (e.g., in the Z-direction). As shown, the sidewalls 912 may define a substantially square shaped of the first frame 102. The sidewalls 912 also define the first perimeter 802 of the first frame 102.

The modular backboard 212 may be disposed on a rear surface 914 of the first frame 102. Shelving, hooks, etc. may be disposed on the modular backboard 212. The modular backboard 212 may include various holes, slits, slots, etc. for receiving the shelving, hooks, etc. The lighting elements 214 may be disposed on the first sidewall 912(1) and the second sidewall 912(2). In an embodiment, the lighting elements 214 may be powered via batteries, or may electrically couple to mains power running through the wall 300. In this instance, wiring of the lighting elements 214 may be spliced into electrical wiring running through the wall 300 for powering the lighting elements 214. In an embodiment, the storage assembly 100 (e.g., the first frame 102) may include a junction box, connectors, etc. for supply powering to the lighting elements 214. Additionally, although the lighting elements 214 are shown at a particular location within the interior cavity 202, the lighting elements 214 may be located differently than shown. Moreover, more than two of the lighting elements 214 may be included, and/or the lighting elements 214 may be differently sized and/or shaped.

The first frame 102 includes the front 900, which when installed on the wall 300, may be flush with the exterior surface 304. In an embodiment, the sidewalls 912 may include a flange (e.g., nailing flange, etc.) for coupling the first frame 102 to the wall 300. For example, nails, screws, etc. may be disposed through the flange and into the exterior surface 304. In other embodiments, nails, screws, etc. may be disposed through one or more of the sidewalls 912 and/or the rear surface 914, for example, and into the wall 300 for securing the first frame 102 within the wall 300.

The first frame 102 includes the first base 208 and the second base 210. The first base 208 may be located proximate to the bottom 910, while the second base 210 may be located proximate to the top 908. The first section 502 of the first set of guide rails 204 may be disposed on the first base 208, and the first section 700 of the second set of guide rails 206 may be disposed on the second base 210. The first section 502 and the first section 700 may be fastened (e.g., screwed) into the first base 208 and the second base 210, respectively.

As introduced above, the first base 208 and the second base 210 may include an angle such that the second frame 104 opens in the direction of travel 200 that is non-parallel to the exterior surface 304 of the wall 300. The first base 208 and the second base 210 may include a substantially triangular shape. The angling of the first base 208 is shown in the cross-sectional view of FIG. 9C. However, although described with regard to the first base 208, the second base 210 may include similar features. One way to express the angling of the first base 208 may be with regard to a surface 916 of the first base 208. The surface 916, from the first side 904 of the first frame 102 to the second side 906 of the first frame 102, may extend in a direction away from the rear surface 914. For example, proximate to or at the first side 904 of the first frame 102, the surface 916 may be spaced apart from the rear surface 914 by a first distance 918. Proximate to or at the second side 906, the surface 916 may be spaced apart from the rear surface 914 by a second distance 920 that is greater than the first distance 918. Being as the second distance 920 is greater than the first distance, the surface 916 may be angled (e.g., slanted, tilted, inclined, etc.) in a direction away from the rear surface 914, from the first side 904 to the second side 906. Or the surface 916, proximate to the first side 904, may be spaced apart from the front 900 by a third distance that is greater than a fourth distance, proximate to the second side 906, between the front 900 and the surface 916.

As another example, the surface 916 may be disposed at an angle θ relative to the rear surface 914. The first section 502 may be disposed on the surface 916. In an embodiment the angle θ may be between approximately (e.g., +/−0.5 degrees) five degrees and twenty degrees, between ten degrees and thirty degrees, etc. In an embodiment, the angle θ may be less than ninety degrees, less than sixty degrees, less than forty degrees, etc. In an embodiment, the angle θ may be greater than zero degrees, but less than ninety degrees. Other angles for the angle θ are envisioned, however, and it is to be understood that the greater the angle θ, the farther away from the exterior surface 304 of the wall 300 the second frame 104 may be disposed in the open state, and/or the greater the depth 500 of the first frame 102 to accommodate such. For example, if the angle θ is ten degrees, the second frame 104 may be spaced apart from the exterior surface 304 of the wall 300 by a lesser distance in the open state as compared to if the angle θ is thirty degrees.

Although the angle θ is described as being relative to the rear surface 914 and the surface 916, the angle θ may be relative to other surfaces, sides, etc. For example, the surface 916 may be oriented at a certain angle relative to the first sidewall 912(1), the second sidewall 912(2), the exterior surface 304 of the wall 300, the modular backboard 212, and so forth. Moreover, although the surface 916 is shown extending from a first corner (e.g., at an intersection between the first sidewall 912(1) and the rear surface 914) to a second corner (e.g., at an intersection between the second sidewall 912(2) and the front 900), the surface 916 may be disposed differently than shown. As shown, the first section 700 may be disposed on a surface 926 of the second base 210.

Given the angle of the first base 208 and the second base 210, a first pocket 922 may be formed along the first sidewall 912(1) and the fourth sidewall 912(4). A second pocket 924 may be formed along the first sidewall 912(2) and the third sidewall 912(3). The first platform 506 may be disposed at least partially within the first pocket 922 and the second platform 800 may be disposed at least partially within the second pocket 924 in the closed state of the storage assembly 100. The first pocket 922 and the second pocket 924 may be substantially triangular shaped. Additionally, a shelf 928 may be formed via the first base 208, for example, on which item(s) may be placed.

FIGS. 10A-10E illustrate various views of the second frame 104, according to an embodiment of the present disclosure. The second frame 104 includes a front 1000, a back 1002 spaced apart from the front 1000 (e.g., in the Z-direction), a first side 1004, a second side 1006 spaced apart from the first side 1004 (e.g., in the X-direction), a top 1008, and a bottom 1010 spaced apart from the top 1008 (e.g., in the Y-direction).

The back 1002 may be oriented towards the first frame 102, and/or the interior cavity 202. The first platform 506 and the second platform 800 may be formed on, or extend from the back 1002, or a rear surface 1012 thereof. The second section 504 of the first set of guide rails 204 may be disposed on the first platform 506, such as a first surface 1014 of the first platform 506, and the second section 702 of the second set of guide rails 206 may be disposed on the second platform 800, such as a second surface 1016 of the second platform 800. The third section 508 may be slidingly engaged with the second section 504 and engaged with the first section 502 for coupling the first frame 102 and the second frame 104 together. Likewise, the third section 704 may be slidingly engaged with the second section 702 and engaged with the first section 700 for coupling the first frame 102 and the second frame 104 together.

Figure 10A:
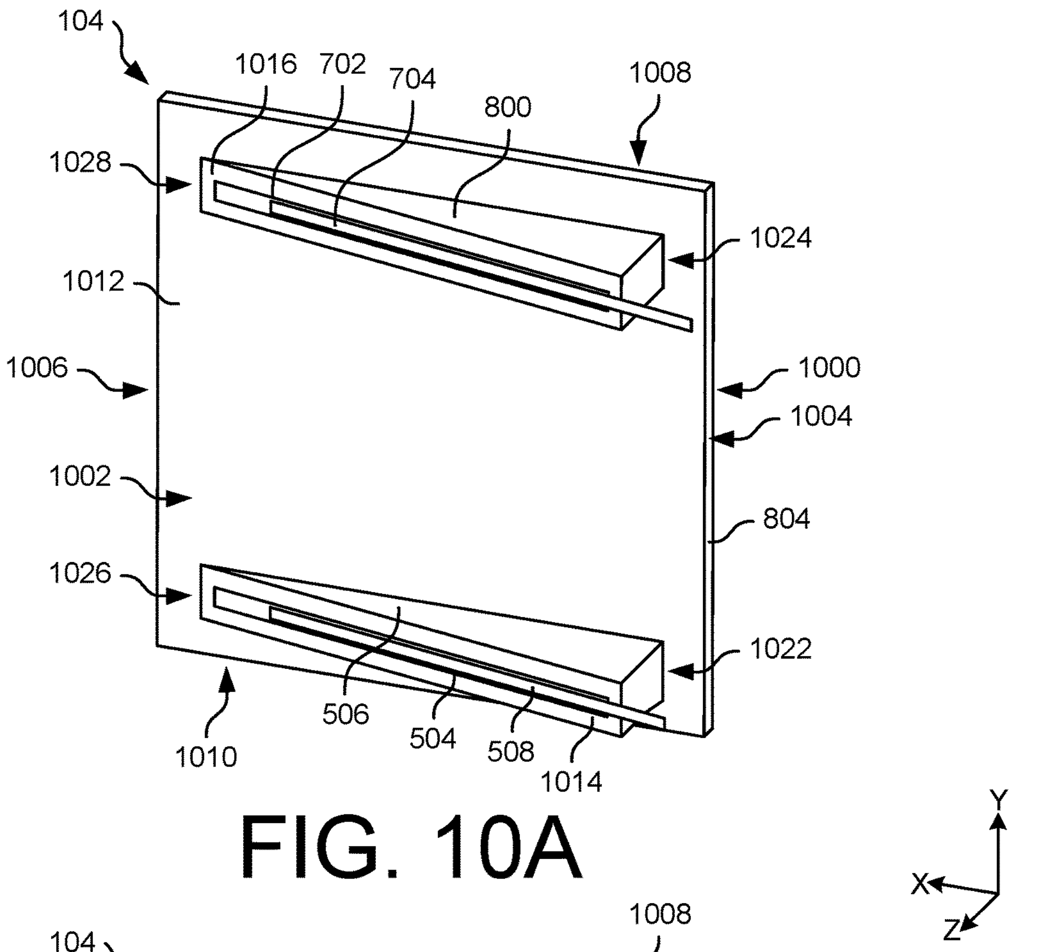
FIG. 10A illustrates a perspective view of an example second frame of the storage assembly of FIG. 1, according to an embodiment of the present disclosure.
Figure 10B:
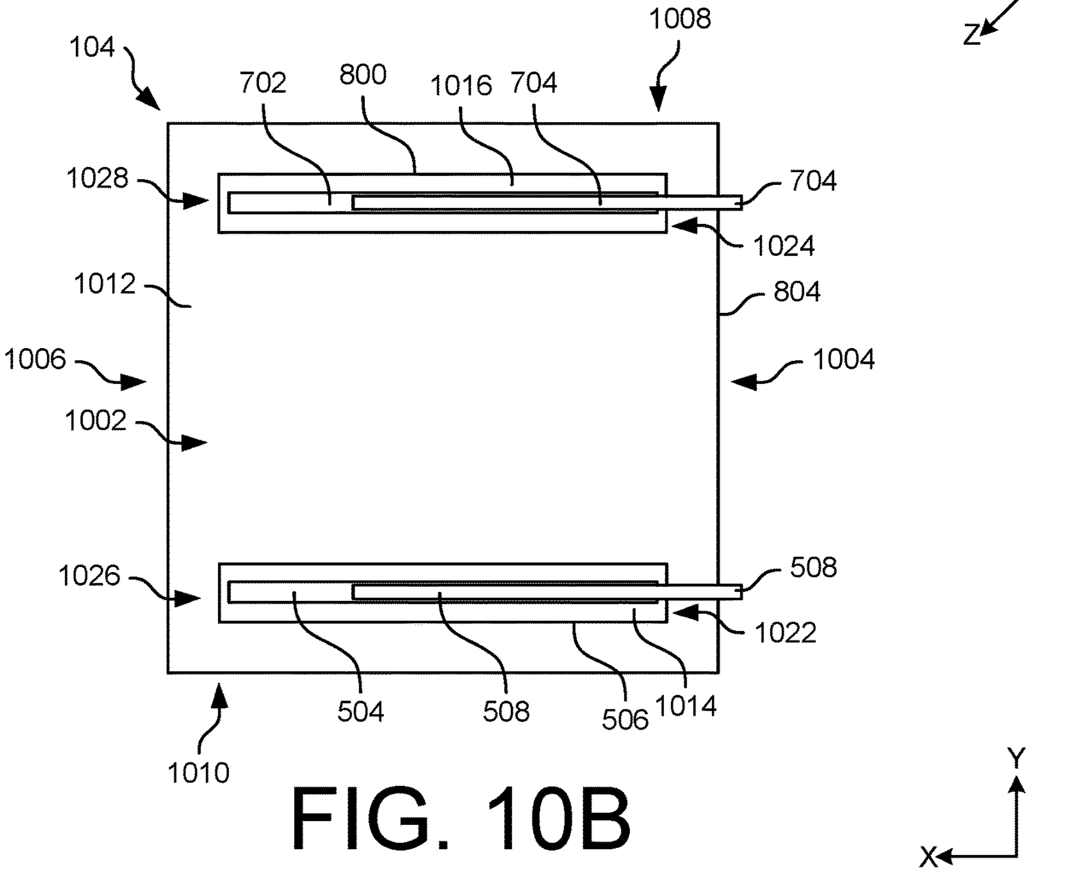
FIG. 10B illustrates a rear view of the second frame of FIG. 10A, according to an embodiment of the present disclosure.
Figures 10C, 10D, 10E:
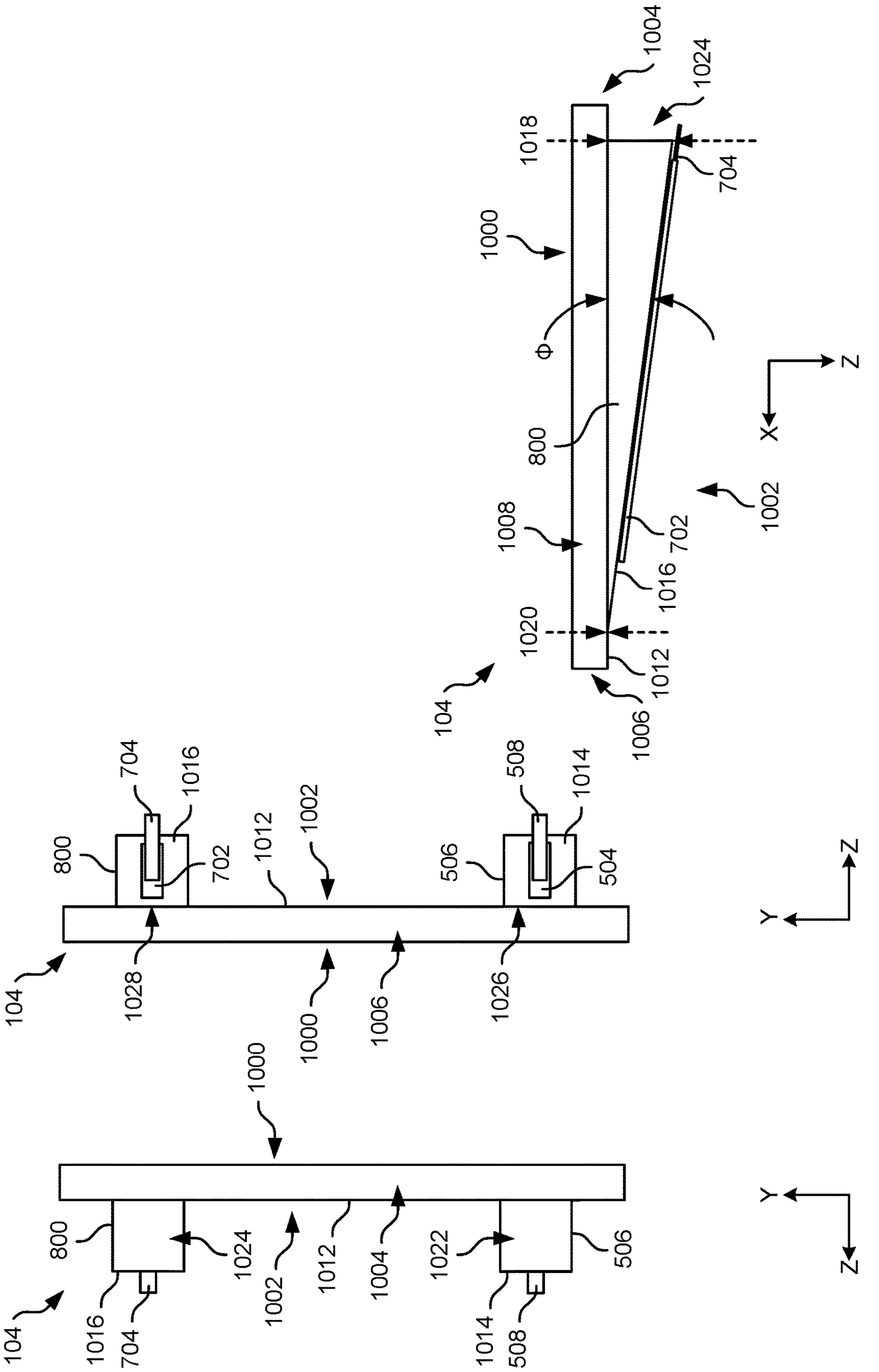
FIG. 10C illustrates a first side view of the second frame of FIG. 10A, according to an embodiment of the present disclosure.
FIG. 10D illustrates a second side view of the second frame of FIG. 10A, according to an embodiment of the present disclosure.
FIG. 10E illustrates a third side view of the second frame of FIG. 10A, according to an embodiment of the present disclosure.

The first platform 506 and the second platform 800 may be shaped and sized to be disposed within the first pocket 922 and the second pocket 924, respectively. Similar to the angled nature of the first base 208 and the second base 210, or the surfaces thereof, the first platform 506 and the second platform 800 may include a similar angled nature. For example, as shown in FIG. 10E, which illustrates a view of the second platform 800, the second surface 1016 may extend from the first side 1004 of the first frame 102 towards the second side 1006, in a direction towards the rear surface 1012. For example, proximate to the first side 1004 of the second frame 104, the second surface 1016 may be spaced apart from the rear surface 1012 by a first distance 1018. Proximate to the second side 1006 of the second frame 104, the second surface 1016 may be spaced apart from the rear surface 1012 by a second distance 1220 that is less than the first distance 1018. This forms the triangular shape of the second platform 800.

In an embodiment, the second surface 1016 may be oriented at an angle Φ relative to the rear surface 1012. In an embodiment the angle Φ may be between approximately (e.g., +/−0.5 degrees) five degrees and twenty degrees, between ten degrees and thirty degrees, etc. In an embodiment, the angle Φ may be less than ninety degrees, less than sixty degrees, less than forty degrees, etc. In an embodiment, the angle Φ may be greater than zero degrees, but less than ninety degrees. Other degrees for the angle Φ are envisioned, however. In an embodiment, the angle Φ may be the same as, or equal to, the angle θ. Additionally, although discussed as pertaining to the second platform 800, the first platform 506 may include similar features. Moreover, an area, section, segment, etc. of the rear surface 1012 between the first platform 506 and the second platform 800 may be void, for example, to accommodate the item(s) within the interior cavity 202.

In an embodiment, a first end 1022 of the first platform 506 may abut the first sidewall 912(1) in the closed state, and/or a second end 1024 of the second platform 800 may abut the first sidewall 912(1) in the closed state. The first platform 506 may also include a third end 1026, opposite the first end 1022, may be spaced apart from the second perimeter 804 of the second frame 104. The first end 1022 may similarly be spaced apart from the second perimeter 804. Similarly, a fourth end 1028, opposite the second end 1024, may be spaced apart from the second perimeter 804 of the second frame 104. The second end 1024 may similarly be spaced apart from the second perimeter 804. In doing so, the second frame 104 may conceal the first perimeter 802 of the first frame 102.

Figure 11:
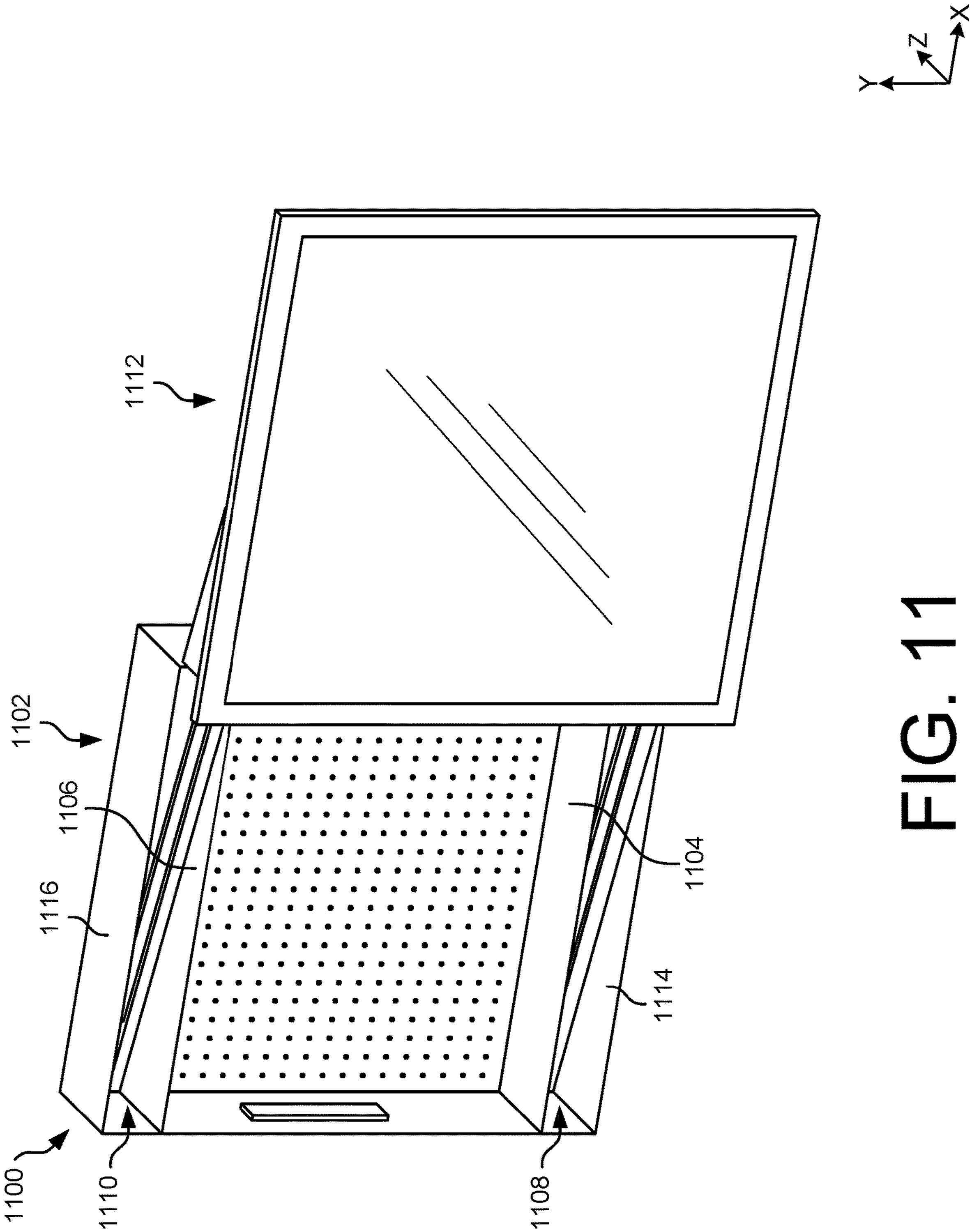
FIG. 11 illustrates a perspective view of an example storage assembly in an open state, according to an embodiment of the present disclosure.

FIG. 11 illustrates an example storage assembly 1100, according to an embodiment of the present disclosure. The storage assembly 1100 may be similar to the storage assembly 100 as discussed above. However, as shown, a first frame 1102 of the storage assembly 1100 may include a first shelf 1104 and a second shelf 1106. The first shelf 1104 and the second shelf 1106 may at least partially form pockets, such as a first pocket 1108 and a second pocket 1110, that receive a first platform and a second platform on the back of a second frame 1112. In the closed state, the first platform may reside within the first pocket 1108, between the first shelf 1104 and a first sidewall 1114 of the first frame 1102, while the second platform may reside within the second pocket 1110, between the second shelf 1106 and a second sidewall 1116 of the first frame 1102.

Figure 12:
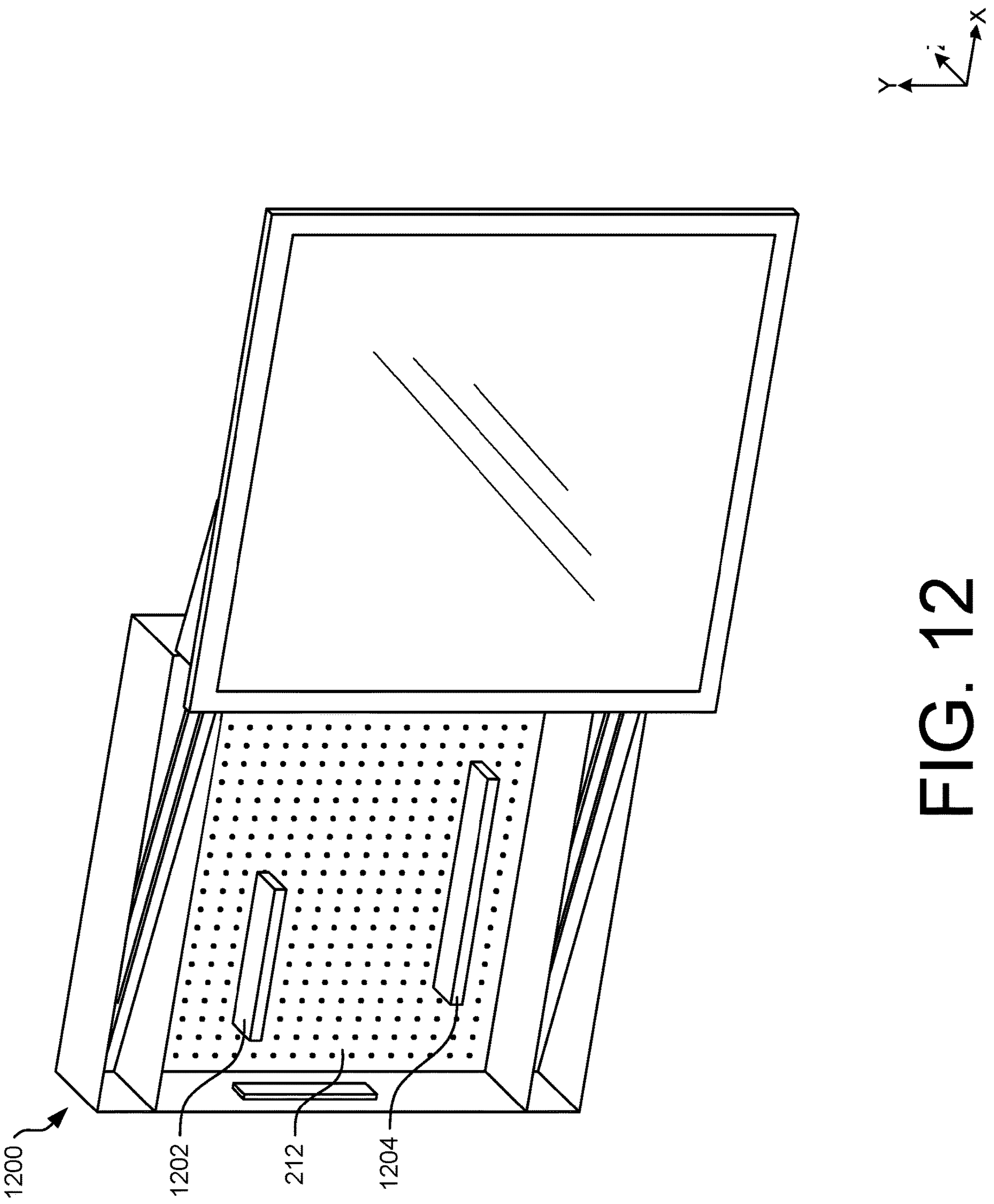
FIG. 12 illustrates a perspective view of an example storage assembly in an open state, according to an embodiment of the present disclosure.

FIG. 12 illustrates an example storage assembly 1200, according to an embodiment of the present disclosure. The storage assembly 1200 may be similar to the storage assembly 100 and/or the storage assembly 1100 as discussed above. However, the storage assembly 1200 is shown including a first shelf 1202 and a second shelf 1204 disposed on the modular backboard 212. Item(s) may be placed on the first shelf 1202 and/or the second shelf 1204. The first shelf 1202 and the second shelf 1204 may be secured into the modular backboard 212 via fasteners, anchors, clips, etc. Although a particular arrangement of the first shelf 1202 and the second shelf 1204 is shown, other arrangements are envisioned and the shelfs may be sized differently than shown.

Figure 13:
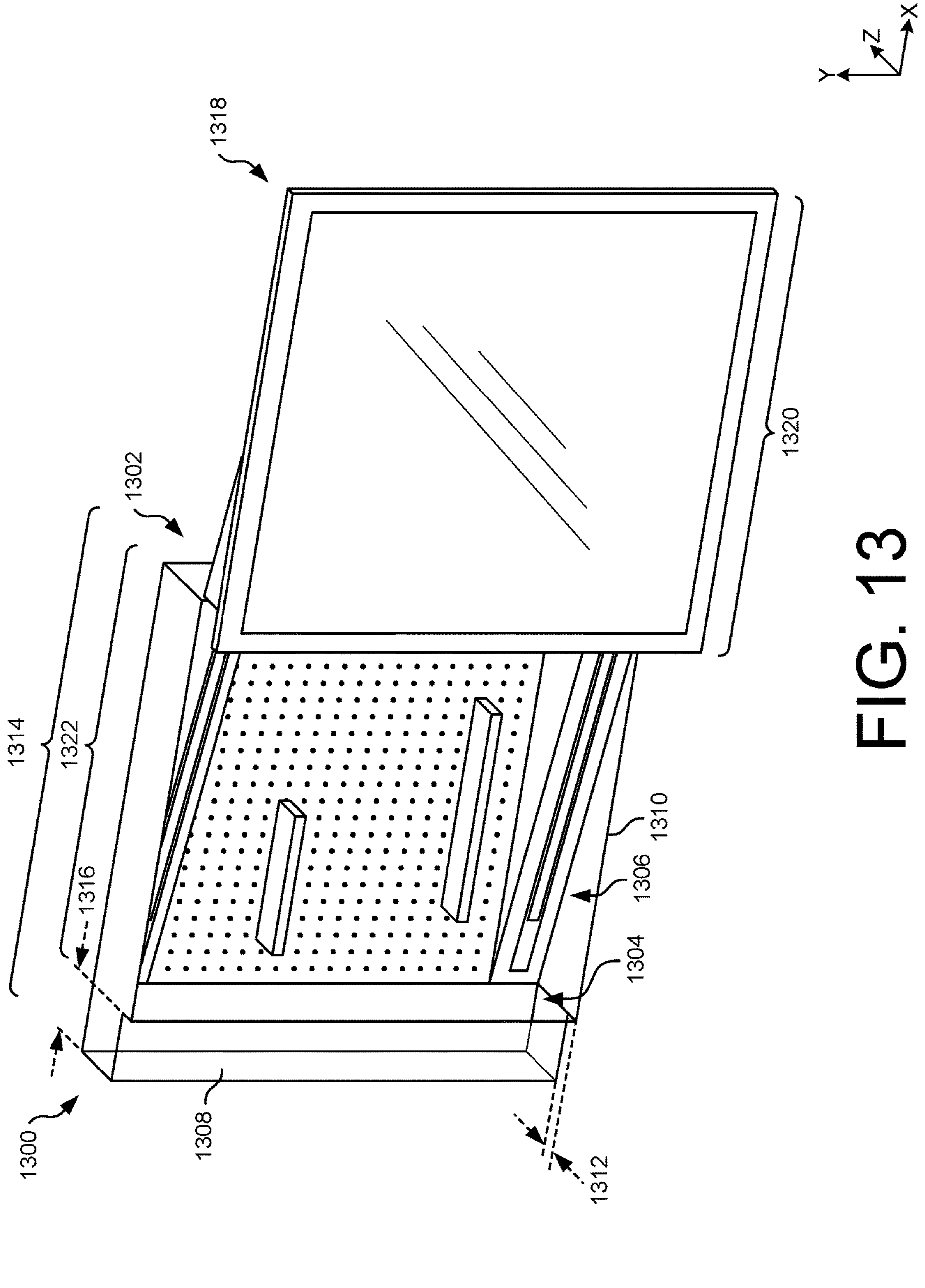
FIG. 13 illustrates a perspective view of an example storage assembly in an open state, according to an embodiment of the present disclosure.

FIG. 13 illustrates an example storage assembly 1300, according to an embodiment of the present disclosure. The storage assembly 1300 may be similar to the storage assembly 100, the storage assembly 1100, and/or the storage assembly 1200 as discussed above.

A first frame 1302 of the storage assembly 1300 may define a compartment 1304 (e.g., cubby, receptacle, etc.). The compartment 1304 may be part of an interior cavity 1306 of the first frame 1302 and may be accessible via the interior cavity 1306. In an embodiment, the compartment 1304 may include shelves, hooks, pockets, doors, etc. The compartment 1304 may act as an extension of the interior cavity 1306, for example, to increase a size of the interior cavity 1306. To conceal the storage assembly 1300 within the wall 300, for example, a surface 1308 of the compartment 1304 may be offset from a front 1310 of the first frame 1302 by a distance 1312. In an embodiment, the distance 1312 may accommodate sheetrock, paneling, or other wall finishes. In other words, a portion of the wall 300 may be disposed in front of the compartment 1304, adjacent to the surface 1308.

The first frame 1302 may include a first width 1322, along the front 1310, and a second width 1314 (e.g., in the X-direction). The second width 1314 may be greater than the first width 1322 and includes a third width 1316 of the compartment 1304. In other words, the first width 1322 is equal to the second width 1314, less the third width 1316. A second frame 1318 of the storage assembly 1300 includes a fourth width 1320 that is greater than the first width 1322. As such, in the closed state, the second frame 1318 may conceal the first frame 1302.

Although the compartment 1304 is shown located on a certain side of the first frame 1302, additional compartments may be located elsewhere (e.g., top, bottom, etc.). Additionally, the compartment 1304 may be sized differently than shown (e.g., the compartment 1304 may not be an entire height, in the Y-direction, of the first frame 1302).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A storage assembly comprising:

a first frame configured to be at least partially disposed within a structure, the first frame including a first footprint and an interior cavity having a rear surface;

a second frame slidably engaged with the first frame, the second frame including a second footprint larger than the first footprint, the second frame being configured to move between (i) a first position in which the second frame is disposed over the interior cavity to restrict access to the interior cavity, and (ii) a second position in which the second frame is spaced apart from the interior cavity to permit access to the interior cavity;

a first set of guide rails coupled to (i) a first surface of a first base of the first frame that is non-parallel and non-perpendicular with the rear surface of the interior cavity and (ii) a first surface of a first platform of the second frame that is non-parallel and non-perpendicular with a rear surface of the second frame; and a second set of guide rails coupled to (i) a second surface of a second base of the first frame that is non-parallel and non-perpendicular with the rear surface of the interior cavity and (ii) a second surface of a second platform of the second frame that is non-parallel and non-perpendicular with the rear surface of the second frame;

wherein the first set of guide rails and the second set of guide rails are configured to transition the second frame between the first position and the second position in a direction that is non-parallel and non-perpendicular to the rear surface of the interior cavity.

2. The storage assembly of claim 1, wherein at least a portion of the second frame is disposed within the interior cavity in the first position.

3. The storage assembly of claim 1, wherein:

the first frame includes:

a front configured to be oriented substantially parallel with the rear surface of the interior cavity, a back configured to be disposed within the structure, a first side, and a second side;

at the first side, the first surface of the first frame and the second surface of the first frame are spaced apart from the front by a first distance; and at the second side, the first surface of the first frame and the second surface of the first frame are spaced apart from the front by a second distance that is less than the first distance.

4. The storage assembly of claim 3, wherein:

the second frame includes:

a second front, and a second back;

the first surface of the second frame includes a first end that is spaced apart from the second back by a third distance;

the second surface of the second frame includes a first end that is spaced apart from the second back by the third distance;

the first surface includes a second end that is spaced apart from the second back by a fourth distance that is less than the third distance; and the second surface of the second frame includes a second end that is spaced apart from the second back by the fourth distance.

5. The storage assembly of claim 4, wherein:

at the second end, the first surface of the first frame is flush with the front of the first frame; and at the second end, the second surface of the second frame is flush with the front of the first frame.

6. The storage assembly of claim 1, further comprising one or more lighting elements at least partially disposed within the interior cavity.

7. A storage assembly comprising:
a first frame including:
an interior cavity having a rear surface,
a first base disposed within the interior cavity, the first base having a first surface that is oriented non-parallel to and non-perpendicular with the rear surface of the interior cavity, and
a second base disposed within the interior cavity, the first base having a second surface that is oriented non-parallel to and non-perpendicular with the rear surface of the interior cavity;
a second frame including:
a rear surface,
a first platform disposed on the rear surface of the second frame, the first platform having a first surface that is oriented non-parallel to and non-perpendicular with the rear surface of the second frame, and
a second platform disposed on the rear surface of the second frame, the second platform having a second surface that is oriented non-parallel to and non-perpendicular with the rear surface of the second frame;
a first set of guide rails at least partially disposed on the first surface of the first base and at least partially disposed on the first surface of the first platform; and
a second set of guide rails at least partially disposed on the second surface of the second base and at least partially disposed on the second surface of the second platform,
wherein the first set of guide rails and the second set of guide rails are configured to transition the storage assembly between a first position in which access to the interior cavity is restricted, and a second position in which access to the interior cavity is permitted.

8. The storage assembly of claim 7, wherein:
the first set of guide rails includes at least:
a first section disposed on the first surface of the first base,
a second section disposed on the first surface of the first platform, and
a third section disposed between the first section and the second section; and
the second set of guide rails includes at least:
a fourth section disposed on the second surface of the second base,
a fifth section disposed on the second surface of the second platform, and
a sixth section disposed between the fourth section and the fifth section.

9. The storage assembly of claim 7, wherein:
the first surface of the first base is disposed at a first angle relative to the rear surface of the interior cavity;
the second surface of the second base is disposed at a second angle relative to the rear surface of the interior cavity;
the first surface of the first platform is disposed at a third angle relative to the rear surface of the second frame;
the second surface of the second platform is disposed at a fourth angle relative to the rear surface of the second frame; and
the first angle, the second angle, the third angle, and the fourth angle are between approximately ten degrees and thirty degrees.

10. The storage assembly of claim 7, wherein:
the first frame includes a first width and a first height; and
the second frame includes:
a second width that is greater than the first width, and
a second height that is greater than the first height.

11. The storage assembly of claim 7, further comprising one or more lighting elements disposed within the interior cavity.

12. The storage assembly of claim 7, further comprising at least one of a shelf or a modular backboard disposed within the interior cavity.

13. A storage assembly configured to be at least partially disposed on a wall, comprising:
a first frame configured to be at least partially disposed within the wall, the first frame at least partially defining an interior cavity having a rear surface;
a second frame configured to transition between a first position in which access to the interior cavity is restricted, and a second position in which access to the interior cavity is permitted; and
guide rails configured to transition the second frame between the first position and the second position in a direction that is non-parallel to the rear surface of the interior cavity, wherein the guide rails include:
first guide rails coupled to the first frame at a first surface that is non-parallel and non-orthogonal to the rear surface of the interior cavity, and
second guide rails coupled to the first frame at a second surface that is non-parallel and non-orthogonal to the rear surface of the interior cavity.

14. The storage assembly of claim 13, wherein in the first position, the second frame is configured to be disposed at least partially over the wall.

15. The storage assembly of claim 14, wherein:
a portion of the first guide rails couples to the second frame at a third surface that is non-parallel and non-orthogonal to the rear surface of the interior cavity; and
a portion of the second guide rails couples to the second frame at a fourth surface that is non-parallel and non-orthogonal to the rear surface of the interior cavity.

16. The storage assembly of claim 15, wherein:
the first surface and the third surface are substantially parallel; and
the second surface and the fourth surface are substantially parallel.

17. The storage assembly of claim 13, further comprising one or more lighting elements disposed within the interior cavity.

18. The storage assembly of claim 13, wherein:
a portion of the first guide rails couples to the first frame along a first base; and
a portion of the second guide rails couples to the first frame along a second base.

19. The storage assembly of claim 13, wherein in the second position, the second frame is disposed beyond a footprint of the first frame.

20. The storage assembly of claim 13, wherein the second frame couples to the first frame exclusively via the first guide rails and the second guide rails.

* * * * *